(12) United States Patent
Guisewite et al.

(10) Patent No.: US 9,297,654 B2
(45) Date of Patent: Mar. 29, 2016

(54) ASSOCIATING SIGNAL INTELLIGENCE TO OBJECTS VIA RESIDUAL REDUCTION

(71) Applicant: Raytheon Company, Waltham, MA (US)

(72) Inventors: Geoffrey M. Guisewite, State College, PA (US); Robert J. Cole, Pa Furnace, PA (US); Thomas P. Deardorff, Spring Mills, PA (US)

(73) Assignee: Raytheon Company, Waltham, MA (US)

( * ) Notice: Subject to any disclaimer, the term of this patent is extended or adjusted under 35 U.S.C. 154(b) by 121 days.

(21) Appl. No.: 14/180,439

(22) Filed: Feb. 14, 2014

(65) Prior Publication Data

US 2014/0270368 A1    Sep. 18, 2014

Related U.S. Application Data

(60) Provisional application No. 61/788,504, filed on Mar. 15, 2013.

(51) Int. Cl.

| G06K 9/00 | (2006.01) |
|---|---|
| G01C 11/04 | (2006.01) |
| G06T 7/20 | (2006.01) |
| G01S 3/786 | (2006.01) |
| G01S 5/02 | (2010.01) |

(Continued)

(52) U.S. Cl.
CPC .............. *G01C 11/04* (2013.01); *G01S 3/7864* (2013.01); *G01S 5/0278* (2013.01); *G01S 5/14* (2013.01); *G06F 17/30241* (2013.01); *G06F 17/30811* (2013.01); *G06T 7/20* (2013.01)

(58) Field of Classification Search
None
See application file for complete search history.

(56) References Cited

U.S. PATENT DOCUMENTS

| 6,424,410 B1* | 7/2002 | Pelosi ...................... 356/139.03 |
|---|---|---|
| 2003/0142210 A1 | 7/2003 | Carlbom et al. |
| 2006/0095199 A1* | 5/2006 | Lagassey ...................... 701/117 |

(Continued)

FOREIGN PATENT DOCUMENTS

| EP | 0802515 A1 | 10/1997 |
|---|---|---|
| WO | WO-2014/200584 A2 | 12/2014 |
| WO | WO-2014200584 A3 | 12/2014 |

OTHER PUBLICATIONS

"International Application Serial No. PCT/US2014/025543, International Search Report mailed Feb. 12, 2015", 4 pgs.

(Continued)

*Primary Examiner* — Randolph I Chu
(74) *Attorney, Agent, or Firm* — Schwegman Lundberg & Woessner, P.A.

(57) ABSTRACT

Generally discussed herein are systems and apparatuses that are configured to and techniques for associating a SIGnal INTelligence (SIGINT) signal with an object or tracklet. According to an example a technique can include estimating Times of Arrival (ToAs) at each of a plurality of collectors of a first signal from each of a plurality of moving transmitters, each first signal transmitted from a transmitter on a tracklet extracted from video data and received at the plurality of collectors, wherein a location of each of the plurality of collectors is known, comparing each estimated ToA to a respective actual ToA of a SIGINT signal received at each of the collectors, or determining a likelihood that the signal corresponds to the SIGINT signal to determine whether the SIGINT signal was transmitted from a transmitter on the corresponding tracklet.

20 Claims, 15 Drawing Sheets

(51) Int. Cl.
*G01S 5/14* (2006.01)
*G06F 17/30* (2006.01)

(56) References Cited

U.S. PATENT DOCUMENTS

2008/0159590 A1 7/2008 Yi et al.
2010/0138184 A1 6/2010 Fernandez et al.
2011/0137834 A1* 6/2011 Ide et al. .......................... 706/12
2012/0261516 A1* 10/2012 Gilliland et al. ............... 244/183
2014/0070942 A1* 3/2014 Haase et al. ................... 340/532

OTHER PUBLICATIONS

"International Application Serial No. PCT/US2014/025543, Written Opinion mailed Feb. 12, 2015", 7 pgs.
"Application Serial No. PCT/US2014/025543, International Preliminary Report on Patentability mailed Sep. 24, 2015", 9 pgs.

* cited by examiner

THREE OBJECTS, THREE COLLECTORS: RESIDUALS FOR LOW QUALITY SIGINT SIGNALS, TEN OBSERVATIONS

|   | 1 | 2 | 3 |
|---|---|---|---|
| 1 | 0.1325 | 0.2262 | 0.1541 |
| 2 | 0.2259 | 0.1316 | 0.3340 |
| 3 | 0.1525 | 0.3340 | 0.1337 |

TABLE 3

THREE OBJECTS, THREE COLLECTORS: RESIDUALS FOR LOW QUALITY SIGINT SIGNALS, TWENTY-FIVE OBSERVATIONS

|   | 1 | 2 | 3 |
|---|---|---|---|
| 1 | 0.5125 | 0.8812 | 1.062 |
| 2 | 0.8750 | 0.5125 | 0.7562 |
| 3 | 1.087 | 0.7500 | 0.5062 |

TABLE 7

ASSOCIATING SIGNAL INTELLIGENCE TO OBJECTS VIA RESIDUAL REDUCTION

RELATED APPLICATION

This application claims priority to U.S. Provisional Application Ser. No. 61/788,504, filed Mar. 15, 2013, which is incorporated herein by reference in its entirety.

TECHNICAL FIELD

Examples generally relate to associating a SIGnal INTelligence (SIGINT) signal to a moving object, such as an object that can be moving, stationary, or has been or is being tracked.

TECHNICAL BACKGROUND

SIGINT can be data gathered through signal interception or analysis. SIGINT can be broken into two broad categories: (1) COMmunications INTelligence (COMINT) and (2) ELectronic signal INTelligence (ELINT). COMINT deals with data gleaned from messages or voice information, while ELINT deals with data gleaned from non-communication sensors (e.g., Global Positioning System (GPS) sensors).

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments or examples discussed in the present document.

DESCRIPTION OF EMBODIMENTS

Figure 1:
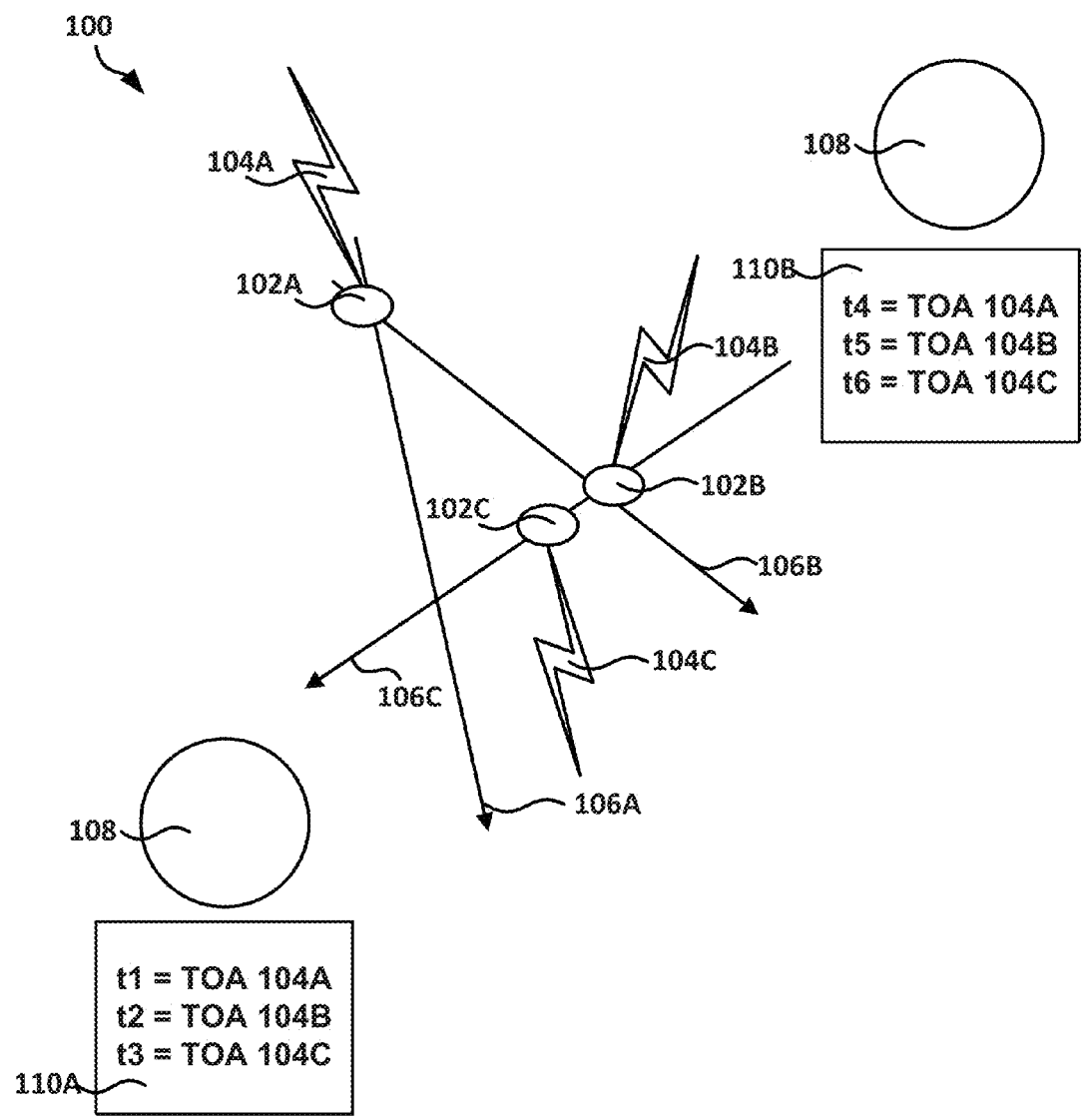
FIG. 1 shows an example of a system for associating a SIGINT event with a tracklet (i.e. track fragment or at least partial track).

Examples in this disclosure relate to associating a SIGINT event with an object on a tracklet extracted from video data. More specifically, examples can relate to apparatuses, systems, and techniques for determining which tracklet a SIGINT event originated from, such as in an environment with a high density of SIGINT transmitters or a high density of movers or associated tracklets. Even more specifically, examples can relate to apparatuses, systems, or techniques for speeding up a process of associating a SIGINT signal with an object or tracklet.

Exploiting SIGINT to determine a location of an emitter is a common practice. Stationary emitters can be integrated over time to achieve improved accuracy and can present a less challenging version of a problem solved using a technique disclosed herein.

Moving emitters are more challenging because, at least in part, the uncertainty in motion of the emitter. The motion of the emitter can limit the ability to integrate over time. A situation that can be even more challenging can include associating a SIGINT signal to a moving emitter in an environment with a high density of moving emitters that are emitting SIGINT signals. The challenge is due to, at least in part, the combination of large confidence regions associated with estimated locations of the emitters. The large confidence region can be due to motion of the emitter and ambiguity that can be caused by multiple emitters, such as by confidence regions (e.g., residual regions or ellipses) associated with a location where a SIGINT signal originated including multiple emitters. The large confidence region can encompass many emitters simultaneously, thus making the association of a SIGINT event with a track (e.g., a tracklet extracted from video data) not deterministic (see FIG. 2 and the corresponding description for a more detailed explanation of overlapping confidence regions).

Another complication to associating a SIGINT signal with an object, such as beyond multiple emitter objects existing within a residual, can include a tracklet being considered variable, such as within a duration of observations (e.g., video data). A sum-of-squared residuals based on the number of observations can be scaled to help overcome this problem. Only tracks with durations that support an "adequate" number of potential associated SIGINT events may be considered, such as can be implemented in getTracksfromMovers pseudocode, such as is presented herein.

Exploiting SIGINT to support multi-hypothesis tracking (e.g., associating a plurality of distinct sets of SIGINT signals with a respective object) has been previously unsuccessful for moving emitters in high density environments. Previous attempts to associate a SIGINT event with a mover (e.g., a moving object or emitter) in an urban environment has failed, at least in part, because of large regions of uncertainty and a density of emitters (e.g., transmitters that emit a SIGINT signal) within the confidence region.

Advances in video tracking can improve the resolution and accuracy of tracks. Signal processing techniques can support the association of SIGINT events based on electronic content and externals. Combining the ability to associate movers with tracks and associate SIGINT events to a common emitter (e.g., an emitter with a known location at a given time) with the concept of reduction or minimization of residuals (e.g., reducing a difference in expected and observed Time Of Arrival (ToA) for an emitter at a known location or collectors at predictable or known locations over time) can help in associating a SIGINT event with an emitter.

One or more approaches to associating a SIGINT event with an object or track disclosed herein investigates hypotheses that associate a SIGINT event to an emitter location over time (e.g., from a track extracted from video data) by computing the sum-of-square residuals for each of the hypotheses. Each hypothesis can be the association of one or more SIGINT events with a specific track and the residual can indicate a relative probability that the SIGINT event actually originated from an emitter on the track.

An interpolation of tracks to times that support the observed times-of-arrival at a set of collectors can provide a constrained geo-location problem that, when solved, can help the association of a SIGINT signal to an object or tracklet. One or more approaches discussed herein differ from previous attempts that associate and exploit confidence ellipses resulting from multiple SIGINT events over time. Previous attempts calculate a region in which a SIGINT signal is expected to have originated from and if the confidence region includes only one emitter or object then the SIGINT signal is assumed to have originated from that emitter. This approach does not work in environments with emitters that are relatively close together so that multiple emitters are in the confidence region. Efforts to aggregate a series of SIGINT events to reduce ambiguity have been stymied, at least in part, due to the high density of emitters and the limited capacity to form tracks in high density environments.

Solutions to a SIGINT to mover association problem that include tracking in a cluttered environment can include the exploitation of as much a priori information as possible on a sensor as well as on the targets and, in particular, on the terrain to enhance track quality and track continuity.

Although one or more cases may remain challenging, such as cases in which a variance of the residuals of the correct SIGINT to mover association is large and the distance between objects is small, or cases that include a small number of SIGINT events and relatively agile object motion, this disclosure identifies scenarios where exploiting intermediate geo-location results can provide a mechanism to achieve SIGINT to target track data or object association (e.g., in an optimal sense).

Reference will now be made to the FIGS. to help further explain details regarding how to associate a SIGINT event with a tracklet, such as in an environment that can include multiple moving emitters that can be within the same confidence region or overlapping confidence regions.

FIG. 1 shows an example of a system 100 that can include a plurality of objects 102A, 102B, and 102C, each of the objects 102A-102C can include an emitter configured to transmit a SIGINT signal 104A, 104B, and 104C, respectively. The objects 102A-C can each be moving or stationary. Each of the objects 102A-102C can be filmed (singularly or jointly) and tracklets 106A, 106B, and 106C can be extracted from the video data collected from the filming. The system 100 can include a plurality of collectors 108. The collectors 108 can have a known location at a given time (e.g., the location can be known to within a predictable accuracy if the exact location of the collector is not known). The location of the collectors 108 can commonly be called a collector ephemeris. The collectors 108 can each be stationary or moving.

Consider a case where the following assumptions hold: 1) a number of SIGINT events over time, are from the same emitter; and 2) there are track fragments over the same period of time, that determine (e.g., unambiguously) the location of movers at specific times within the targeted time interval. As used herein, a SIGINT event is a SIGINT signal 104A-104C and a plurality of arrival times of the SIGINT signal 104A-104C, one arrival time at each of the plurality of collectors 108.

Given a collection of sets of SIGINT events from one-to-many collectors 108 (e.g., with an associated ephemeris), the quality of individual SIGINT events (optional), and a collection of tracklets 106A-106C (e.g., track fragments) for moving objects 102A-102C, a maximum likelihood can be applied to determine an assignment (e.g., a best assignment) of SIGINT events (e.g., SIGINT signals 104A-C) to track fragments, such as the tracklets 106A-C. The residuals of the trial associations, an intermediate result to conventional geo-location, can provide an indicator of the confidence of each assignment. As a result, these residuals can be used to both select a set (e.g., an optimal set) of associations, or can provide additional information, such as a physical feature measurement of an object 102A-C, to support multi-hypothesis tracking.

A position of the object 102A along each tracklet 106A-C can be interpolated or predicted, such as by modeling how long it would take for the SIGINT signal 104A to travel from a transmitter associated with the object 102A-C to the respective collector 108. The ToA, such as shown at 110A and 110B, of the SIGINT signal 104A (e.g., t1 and t4 for SIGINT signal 104A) can be used to interpolate where the object 102A-C would have been on each tracklet 106A-C at the time the SIGINT signal 104A was transmitted. A modeled time it would take for the SIGINT signal 104A to travel from the transmitter to the collector 108 can be calculated. This modeled time can be used to estimate a point on a tracklet 106A-C that the emitter was at the time it transmitted the SIGINT signal 104A. The point on the tracklet 106A-C that is modeled can be the point that reduces (e.g., minimizes) a residual error (e.g., sum of squared differences) of expected ToAs and actual ToAs across all the collectors 108. The modeled time can subtracted from the ToA to get a time of transmission with a residual (e.g., an ellipse or other shape that defines a confidence interval that the transmission occurred at that time). The respective time of transmission or location on the tracklet 106A-C can be compared to determine the residual error. The tracklet 106A-C corresponding to the lowest residual error can be assumed to be the tracklet 106A-C that the SIGINT signal 104A originated from.

For an individual SIGINT event, a collection of observed time-of-arrivals (TOAs), such as at 110A-B, can be generated, one for each of a plurality of collectors 108. For a given location in space, a physical model can predict the expected ToA at each collector 108, such as by modelling how long it would take a SIGINT signal 104A-C to arrive at the collector 108. The time corresponding to the modeled time can be used, such as along with a time corresponding to when the video data was gathered, and compared to actual ToAs of the SIGINT signal 104A-C at each of the plurality of collectors 108. The sum of a squared difference (e.g., a residual) between the physical model and the actual time can be an estimate of the likelihood of that location (e.g., tracklet 106A-C associated with the location) being associated with the SIGINT signal 104A-C (relative to alternatives).

In summary, a geo-location technique can use maximum likelihood to iterate to a local minimum over these squared residuals. The geo-location technique can combine SIGINT events for stationary emitters, or moving emitters. Motion determined by tracks, or the tracklets 106A-C, can be combined with the associated SIGINT events, to achieve association of SIGINT to movers, such as can be characterized by track observations through video over time.

Given an ephemeris (e.g., location of collectors 108), and an ability to interpolate ephemeris to any time in a specified time window, can allow the collector 108 locations for a collection of ToAs to be predicted. Note that collectors 108 can be mobile and need not be stationary.

Given the ability to identify tracklets 106A-C within a time or location window, and the ability to interpolate tracklets 106A-C based on a collection of ToAs for a SIGINT event, the sum-of-squared residuals related to a track and a collection of SIGINT events can be computed.

In some embodiments, it can be beneficial to interpolate where an object 102A-C was located on a specific tracklet 106A-C at a specific time, such as a time that occurred between video frames of video data that captured the track. Interpolating tracks may not be as simple as linear interpolation between observables. There may be no "on the ground" time for a SIGINT event without knowing the location of the emitter (e.g., object 102A-C in or on which the emitter resides or is transmitting from). Interpolating a location on a tracklet 106A-C based on a set of SIGINT observables (e.g., ToAs) can correspond to finding the location along the tracklet 106A-C (e.g., a constrained portion of the tracklet 106A-C that remains after a bounding region that constrains the region in which the SIGINT event could have originated has been determined), which can reduce (e.g., minimize) residuals over all possible locations. This can be viewed as a constrained geo-location where locations are limited to points along the tracklet 106A-C.

Time can remain a factor, as no assumptions about constant motion, or other motion limitations have been made. In one or more examples discussed herein, it can be assumed that tracklets 106A-C are sampled at a high enough resolution that ambiguity in tracklet 106A-C route is not a factor. In one or more examples discussed herein, it can be assumed that variations in object 102A-C speed do not greatly impact the interpolation process. In the process pseudo-code presented below, interpolate Track can be configured to perform a track interpolation function if a track interpolation is needed or desired.

Figure 2:
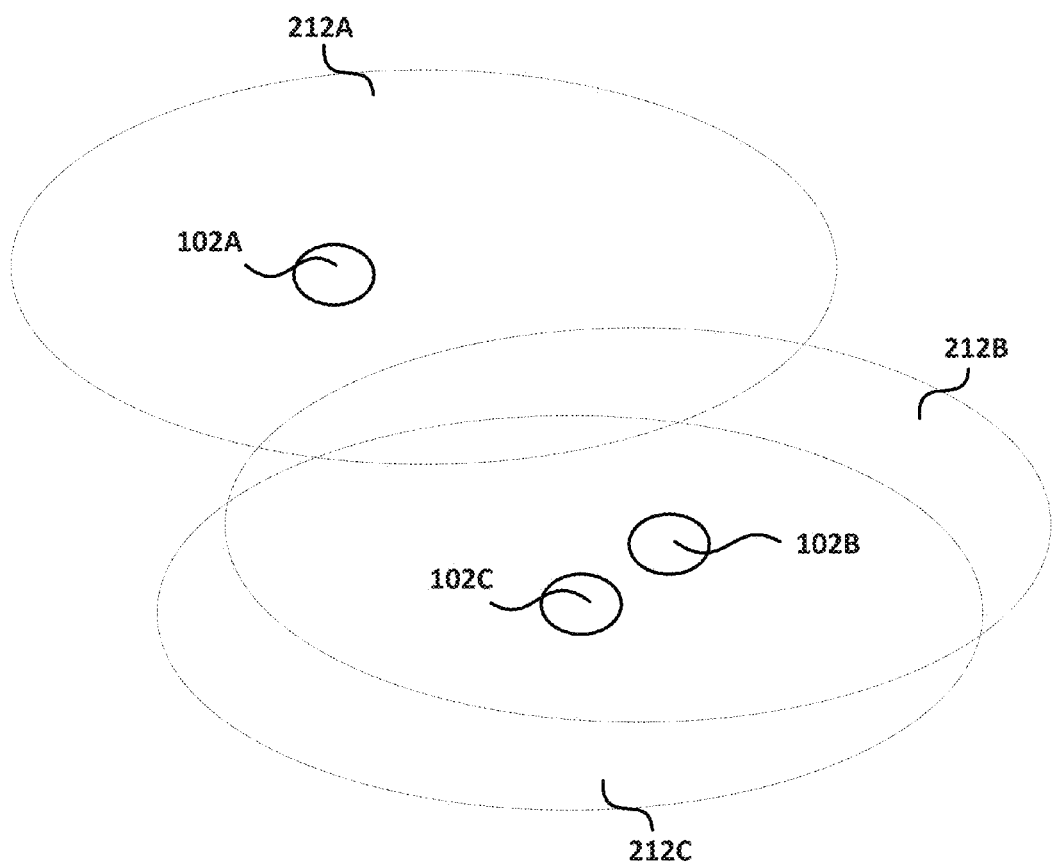
FIG. 2 shows an example of overlapping residual areas (e.g., confidence intervals) for each of a plurality of objects.

FIG. 2 shows an example of the objects 102A-C and their associated residuals 212A, 212B, and 212C, respectively. When a prior SIGINT event to tracklet 106A-C association process is applied to the SIGINT events from objects 102A-C, the process could clearly associate SIGINT events from the residual 212A with a transmitter associated with the object 102A. However, the objects 102B and 102C can be more troublesome. As can be seen, the residuals 212B and 212C both contain the objects 102B and 102C within them, such as near the center of the residual 212B and 212C (e.g., confidence intervals). Prior SIGINT association processes would not be able to determine which object 102B or 102C a SIGINT signal 104B or 104C originated from in the example shown in FIG. 2. One or more of the processes described herein can, sometimes very accurately, determine which object 102B or 102C (or tracklet 106B or 106C associated with the object 102B or 102C, respectively) the SIGINT signal 104B or 104C originated from.

A description of pseudo-code configured for associating a SIGINT event with an object 102A-C of a plurality of objects, such as can help determine which SIGINT signal 104B-C is associated with which object 102B-C as shown in FIG. 2, is presented as follows:

Program Title AssociateSIGINT
Inputs:
A set of N SIGINT observations with locations: L= $\{\mu_1, \ldots, \mu_N\}$ and covariances $\Sigma = \{\Sigma_1, \ldots, \Sigma_N\}$; A set of N sets of TOA measurements, $TOA^j$: For each SIGINT observation j, a set of TOA measurements: $TOA^j = \{TOA_i^j\}$, $1 \leq i \leq |TOA^j|$; A set of N SIGINT observation times: $T = \{t_1, \ldots, t_N\}$; Collector ephemeris E; or Subroutine getTracksfromMovers that identifies tracklets that occur in a time and location window.

Output:
An object index and the computed residuals for that object. If the SIGINT observations can be determined to be associated with a stationary object, M=−1 and the residuals correspond to a fixed location.

Program Description:
Given a set of SIGINT events from a single transmitter, along with the corresponding ephemeris and ToA observables from the collectors, the ability to identify and extract tracklets for the time window and location window containing the SIGINT events, exploit the sum-of-squared residuals to find the most likely track associated with the SIGINT event. Also, compare the alternative assumption of a stationary emitter against the best mover track.

An example of pseudo code configured to implement the foregoing description is presented as follows:

```
Program Start:

R ← getBoundingBox((μ₁, Σ₁), . . . , (μ_N, Σ_N))
% generate box containing SIGINT events
C ← getTracksfromMovers(R, [t₁, t_N])
% identify tracklets that occur in the box and time window
For i = 1:N
    temp1 = 0;
    For j = 1:|C|
        Location = interpolateTrack(C_j, t_i)
```

-continued

Program Start:

% interpolate track j location at current event time $t_i$ $$templ(j) \leftarrow templ(j) + \frac{getResidualError(Location, TOA^j, E, t_i)}{|TOA^j|}$$

END FOR
END FOR
moverIndex ← arg min{temp1} % index of most likely mover
MoverResidual ← min({temp1}) % sum of residuals for most likely mover
stationaryResidual ← getMinResidual(R, TOA, E, T)
% get residuals for best stationary location
IF MoverResidual > stationaryResidual
    moverIndex ← −1
    Residual = stationaryResidual
ELSE
    Residual = MoverResidual
END IF
Return (moverIndex, Residual)

The processing in the AssociateSIGINT function can identify one or more likely objects 102A-C or tracklets 106A-C, such as in a bounding box (e.g., bounding area or region) determined by one or more of the SIGINT events, such as in the collection of SIGINT events.

Alternate assumptions can include that the events are associated with no emitter or object 102A-C in the location window (e.g., bounding box), or the events are associated with a stationary emitter. The former assumption can be based on the likelihood of multiple events all falling outside of the confidence regions for each individual event. This assumption can be discarded. The latter assumption can be retained. This can be addressed by finding a likely location (e.g., the most likely location) of a stationary emitter within the bounding box (e.g., location window), such as based on a sum-of-squared residuals for SIGINT event observables. This can be accomplished using conventional geo-location, or by a grid search, among other techniques. The residuals for this likely stationary location can then be compared against an object 102A-C (e.g., the best object, such as can be associated with the smallest residual error).

AssociateSIGINT can return a mover index (e.g., or a constant, such as "−1" or another constant, or other indicator if it is determined that the object 102A-C is stationary) and a corresponding sum-of-square residuals. AssociateSIGINT can return the sum-of-square residuals for objects 102A-C or tracklets 106A-C, the likely or best stationary location, or corresponding residuals. This information can support identifying potential ambiguity between objects 102A-C (e.g., with residuals that are close in magnitude or overlap). The results for the stationary location can provide confidence information for the hypothesis "stationary or not stationary". In one or more embodiments, the residuals can be normally distributed, resulting in the sum of squared residuals being distributed Chi-square with N−2 degrees of freedom for N observations.

The following description and example pseudo code describes an example of a description of a pseudo code configured to calculate a residual for each object 102A-C or tracklet 106A-C being associated with a given SIGINT event:
Subroutine Title: getResidualError
Inputs:
    A location l at time t; A set of N TOA measurements: $\{TOA_1 \ldots, TOA_N\}$, one for each collector 108; or Ephemeris E.

Output:
    An error sum S
Description:
    Given TOA observations for N collectors, and a location l and time t, compute the sum-of-squared residuals that originate from the assumption that a signal was emitted at time t and location l, resulting in the collection of TOAs at the collectors.

An example of pseudo code configured to implement the foregoing description is presented as follows:
Subroutine Start:

c ← getCollectorLocations(E, t)    %Note: there will be N collector locations
S ← 0
FOR i = 1:N
    S ← S + |getExpectedTOA(c(i),l) − $TOA_i|^2$
END FOR
RETURN S The following description and example pseudo code describes an example of code configured to calculate a minimum residual from all of the calculated residuals:
Subroutine Title: getMinResidual
Inputs:
    A region, R; a set of sets of TOA measurements, $\{TOA_{11}, TOA_{12}, \ldots TOA_{1n(1)}\}, \ldots, \{TOA_{k1}, TOA_{k2}, \ldots TOA_{kn(k)}\}$; ephemeris E; and a set of times T=$\{t_1, \ldots, t_N\}$
Output:
    An error sum S
Description:
    Find the location, x, in region R that minimizes the sum-of-squared TOA residuals across all collectors and all SIGINT events (e.g., across all TOA observations associated with the same SIGINT signal 104A-C). This can be achieved using conventional geo-location maximum likelihood search, or as a brute force grid search.

An example of pseudo code configured to implement the foregoing description is presented as follows:
Subroutine Start:

$$S = \min_{x \in R}\left[\sum_i getResidualError(x, TOA_{i,:}, E, t_i)\right]$$

RETURN $S$

AssociateSIGINT can apply a weight (e.g., an equal weight, different weight, or a combination thereof) to observables (e.g., SIGINT signals 104A-C or events). Covariance matrices can be used to weight the observables, such as can be based on an inverted covariance (e.g., poor measurements can be weighted less than better measurements). Such weighting can result in improved performance when some observables are of poorer quality than others.

getExpectedTOA represents a physical model that predicts the expected observables based on emitter and collection locations and can include environmental factors. This physical model can incorporate the effect of terrain into its estimates, as elevation can directly impact the predicted ToA. Terrain can be used to determine visibility between the collector 108 and emitter (e.g., object 102A-C), resulting in "large" residuals for cases with little or no visibility. This can be an issue for collectors 108 at lower elevations.

Figure 3:
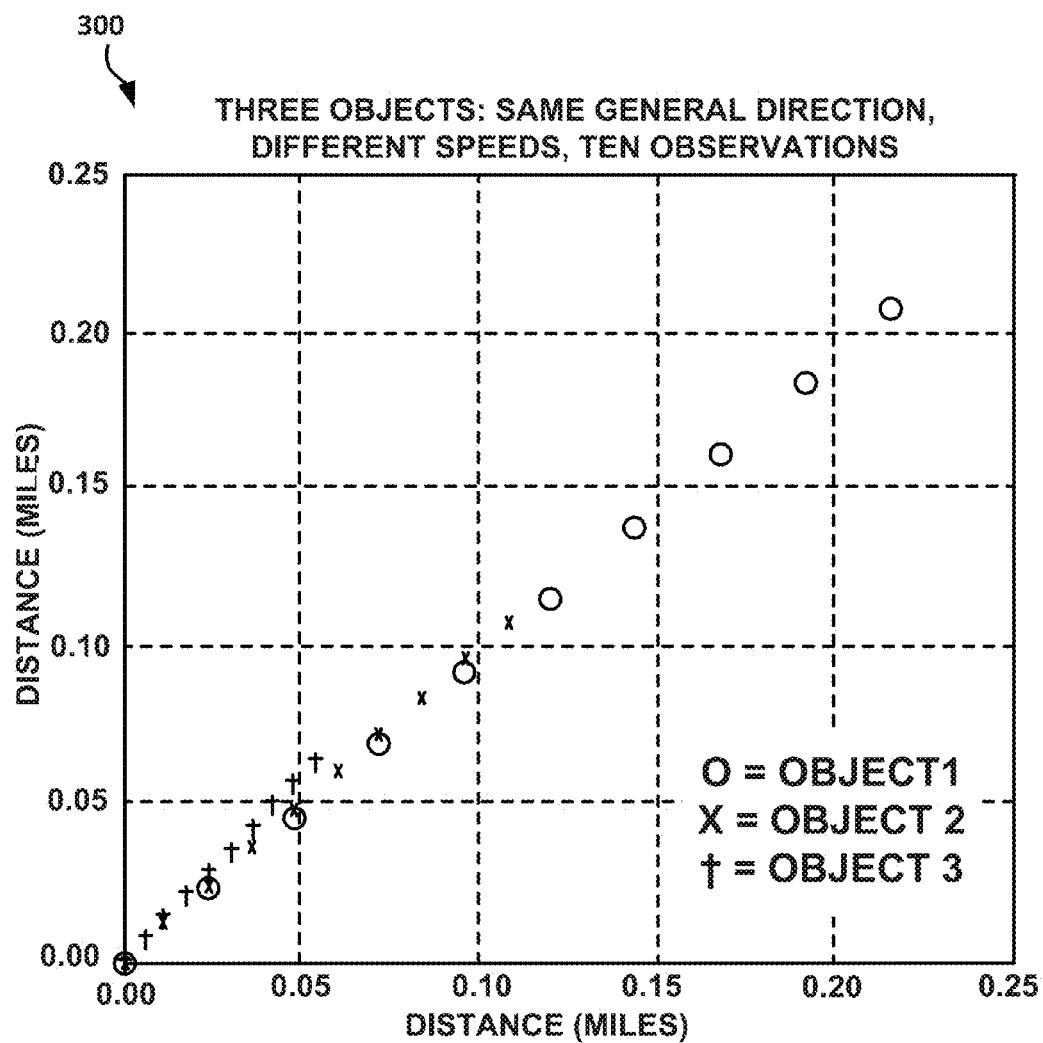
FIG. 3 shows an example of a graph of distance versus distance of ten observations of three objects travelling in the same general direction, each object travelling at a different speed.
Figure 7:
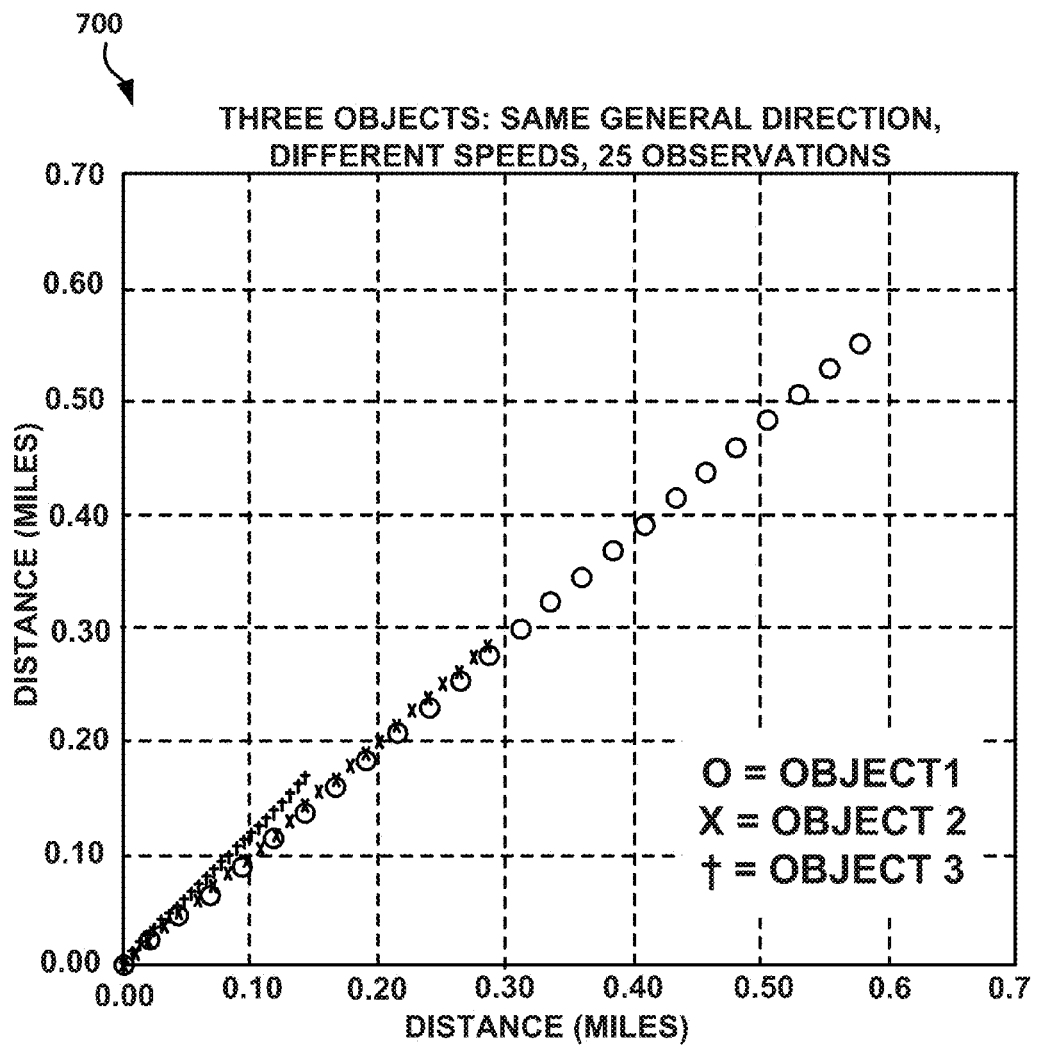
FIG. 7 shows an example of a graph of distance versus distance of twenty-five observations of three objects travelling in the same general direction, each object travelling at a different speed.

Test cases were analyzed and simulated to demonstrate the efficacy of the processes or techniques and associated systems or apparatuses configured to associate SIGINT to objects 102A-C, as discussed herein. The test cases presented herein include three objects starting at the same location, moving in the same general direction, and each object is moving at a different speed (as shown in FIG. 3). These cases were demonstrated for ten associated SIGINT events (FIG. 3) and twenty-five associated SIGINT events (FIG. 7). The twenty-five associated SIGINT events help demonstrate a benefit of more observables (e.g., SIGNT events). The priority application, U.S. Provisional Application Ser. No. 61/788, 504, discusses a few other scenarios, namely, (1) three objects start at the same location and move in different directions (180 degrees and 90 degrees from each other) at the same speed; and (2) three objects start at different locations and move in the same relative direction at the same speed. Results for these two scenarios are also shown and discussed in the priority application, which is incorporated herein by reference in its entirety.

FIG. 3 shows an example of a graph 300 of distance in miles vs distance in miles of three objects (e.g., object 1, object 2, and object 3 as shown in the example of FIG. 3). The three objects move in the same general direction with each object having a different speed.

Figure 4:
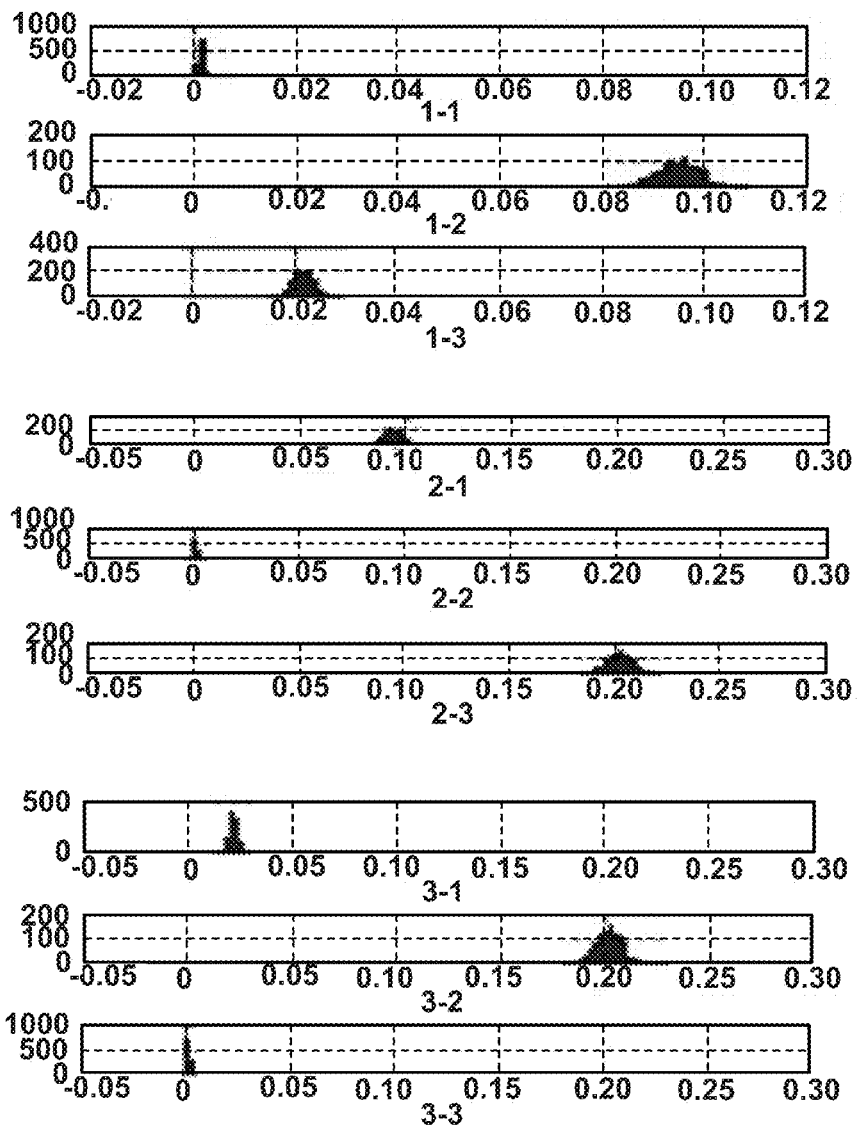
FIG. 4 shows an example of a table that summarizes averages of residual errors determined using ten observations of high quality SIGINT signals sent from the objects shown in FIG. 3 and also shows nine bar graphs, each depicting a distribution of calculated residual errors so as to help visualize how much overlap or separation occurs between the example residual error calculations for the objects.
Figure 5:
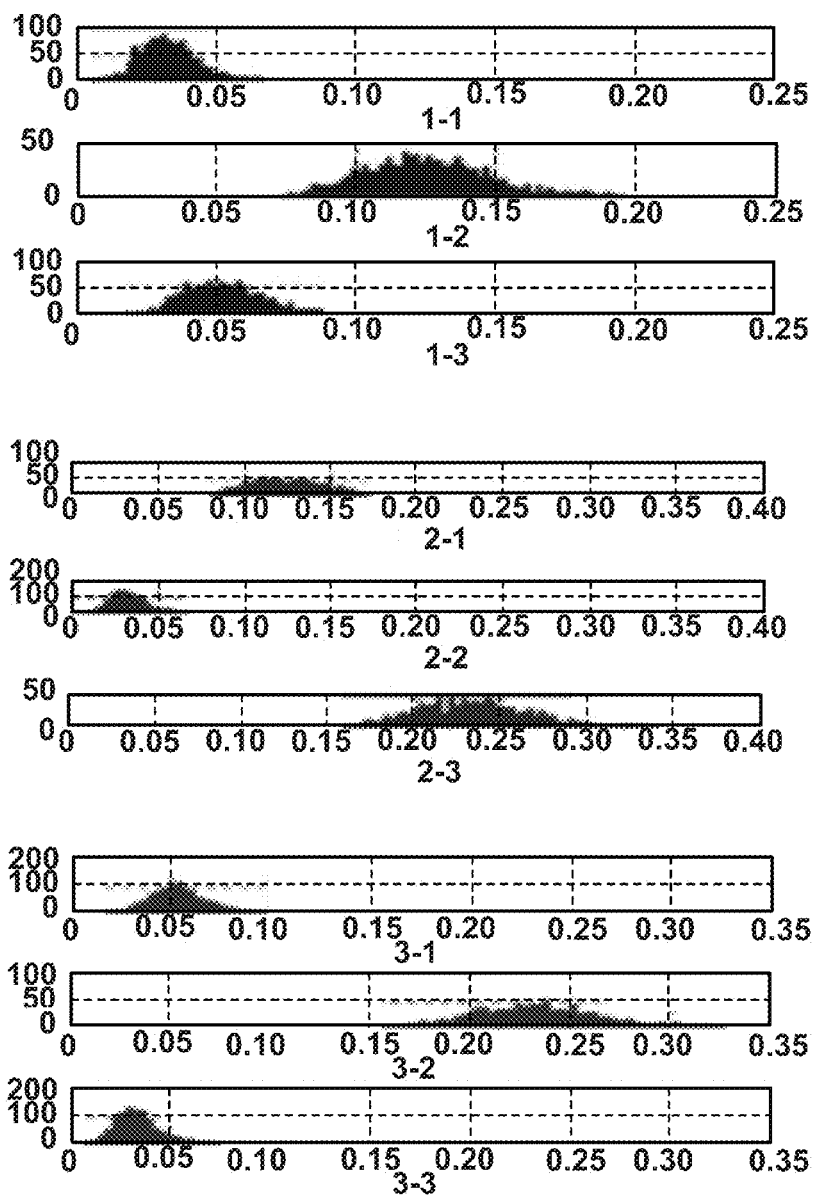
FIG. 5 shows an example of a table that summarizes averages of residual errors determined using ten observations of medium quality SIGINT signals sent from the objects shown in FIG. 3 and also shows nine bar graphs, each depicting a distribution of calculated residual errors so as to help visualize how much overlap or separation occurs between the example residual error calculations for the objects.
Figure 6:
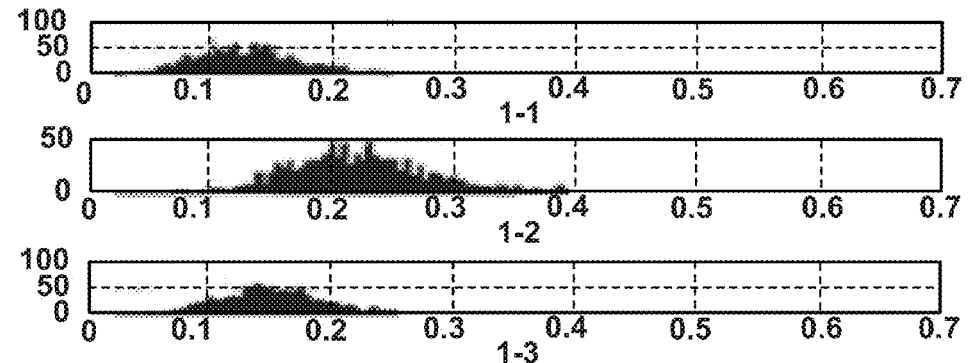
FIG. 6 shows an example of a table that summarizes averages of residual errors determined using ten observations of low quality SIGINT signals sent from the objects shown in FIG. 3 and also shows nine bar graphs, each depicting a distribution of calculated residual errors so as to help visualize how much overlap or separation occurs between the example residual error calculations for the objects.
Figure 6:
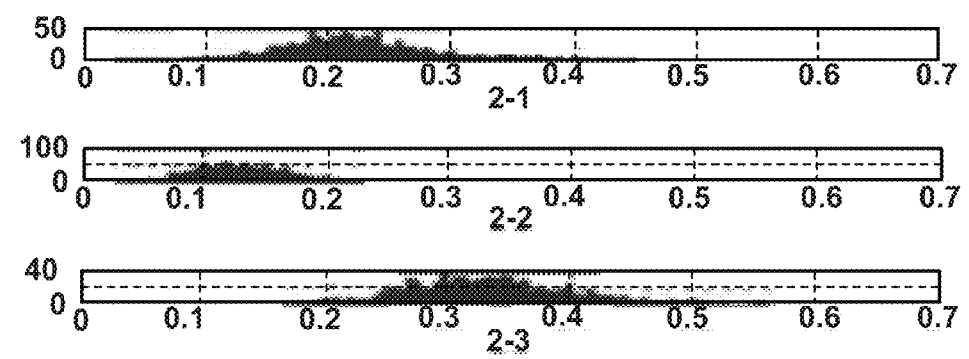
Figure 6:
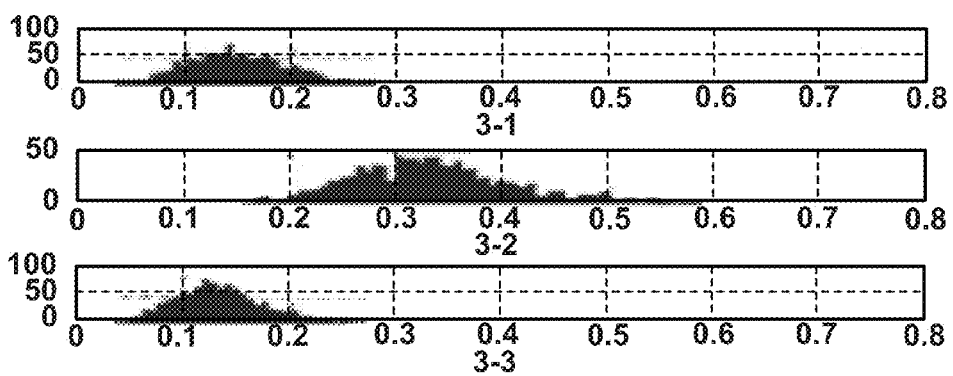

FIG. 4, FIG. 5, and FIG. 6 each show a table, TABLE 1, TABLE 2, and TABLE 3, respectively, that summarizes the average residual error of the nine bar graphs ("1-1"; "1-2"; "1-3"; "2-1"; "2-2"; "2-3"; "3-1"; "3-2"; and "3-3") on each of the respective FIGS. 4, 5, and 6. Graphs labelled 1-1 show the residual calculated in a situation where the correct object 102A-C (e.g., or tracklet 106A-C associated with the object 102A-C) is object one (e.g., the tracklet 106A-C associated with object one) (the "1" before the dash) and that the SIGINT events from object one are being used to determine the residuals (the "1" after the dash). Graphs labelled 1-2 show the residual calculated in a situation where the correct object 102A-C (e.g., or tracklet 106A-C associated with the object 102A-C) is object one (e.g., the tracklet 106A-C associated with object one) and that the SIGINT events from object two are being used to determine the residuals (the "2" after the dash). All the bar graphs are labeled using the same labeling convention. Thus, graphs labelled "3-2" show the residual calculated in a situation where the correct object 102A-C (e.g., or tracklet 106A-C associated with the object 102A-C) is object three (e.g., the tracklet 106A-C associated with object three) and that the SIGINT events from object two are being used to determine the residuals (the "2" after the dash).

FIG. 4 shows residuals calculated using the objects as depicted in FIG. 3 using high quality SIGINT signals (e.g., SIGINT signals 104A-C that have relatively high Signal to Noise Ratio (SNR), no noise, or high magnitude at the collector 108); FIG. 5 shows residuals calculated using the objects as depicted in FIG. 3 using medium quality SIGINT signals 104A-C that have a lower SNR or lower magnitude than the high quality SIGINT signals 104A-C of FIG. 4; and FIG. 6 shows residuals calculated using the objects as depicted in FIG. 3 using low quality SIGINT signals 104A-C that have a lower SNR or lower magnitude than the medium SIGINT signals 104A-C of FIG. 5. This series of FIGS. 4, 5, and 6 shows that the processes discussed herein can associate SIGINT events or signals with objects 102A-C or their associated tracklets 106A-C, such as objects 102A-C that are relatively close together (e.g., within less than about five hundred feet of each other), accurately. The separation of objects that can be tolerated by the process can depend on number or location of collectors 108, object 102A-C movement or object 102A movement relative to another object 102B, number of SIGINT events received from a particular emitter, or combinations thereof. In general, the greater the variety in movement, the greater the number of collectors 108, the greater the number of SIGINT observations, the closer the objects 102A-C can be and still be distinguished from one another. FIGS. 4, 5, and 6 also demonstrate that as the SIGINT signal quality is reduced, the accuracy of the process is also reduced. This is due, at least in part, to the confidence interval of an object 102A-C location being reduced (and the resulting residual ellipse getting bigger) as the quality of the SIGINT signal 104A-C received is reduced.

Figure 8:
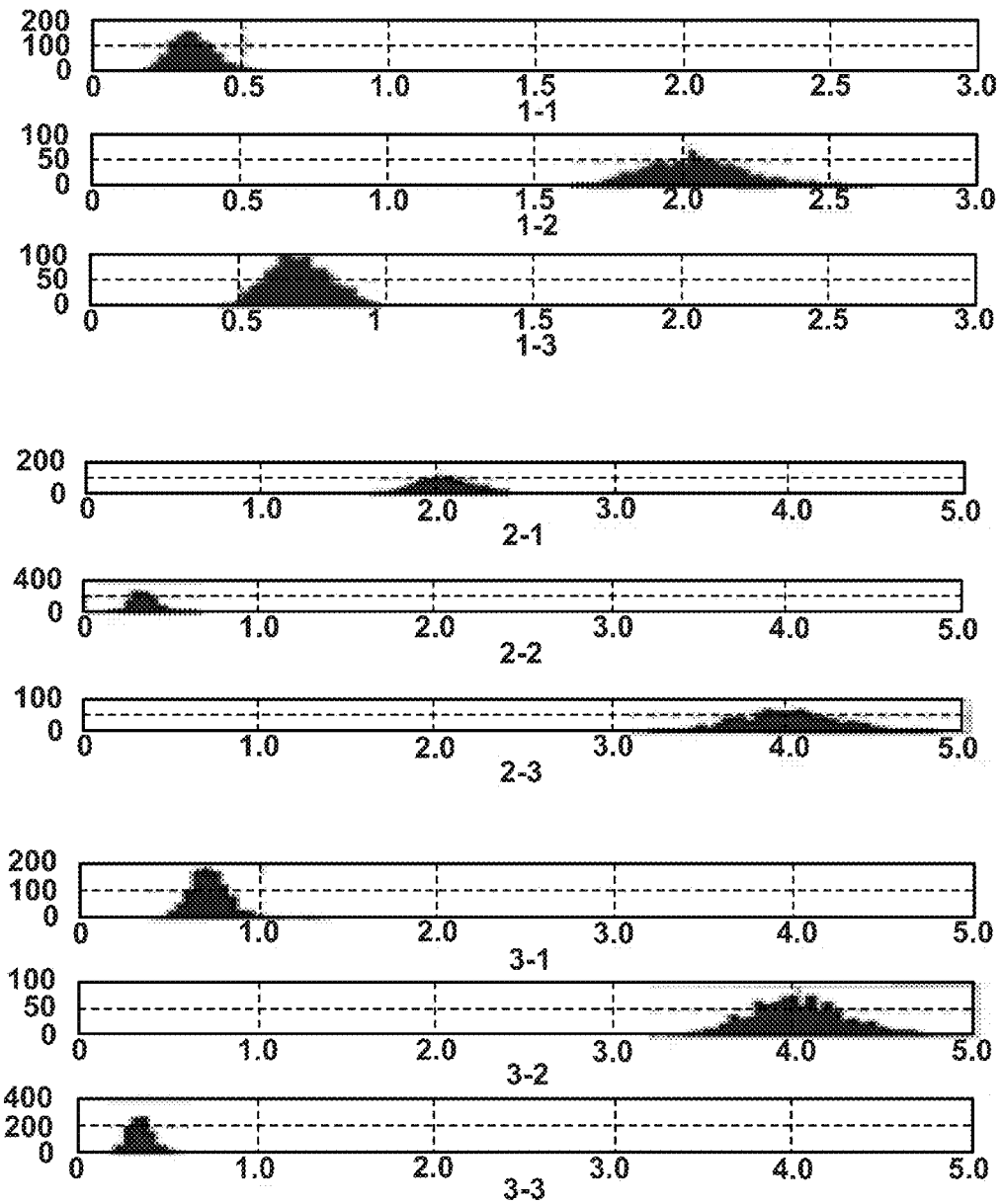
FIG. 8 shows an example of a table that summarizes averages of residual errors determined using ten observations of low quality SIGINT signals sent from the objects shown in FIG. 7 and also shows nine bar graphs, each depicting a distribution of calculated residual errors so as to help visualize how much overlap or separation occurs between the example residual error calculations for the objects.

FIG. 7 shows an example of a graph 700 of distance in miles versus distance in miles substantially similar to that shown in FIG. 3, with the graph in FIG. 7 showing twenty-five observation locations plotted for each object rather than ten. FIG. 8 shows residuals calculated using the objects as depicted in FIG. 7 with low quality (e.g., high variance) SIGINT signals 104A-C that have a higher SNR or lower magnitude than the medium SIGINT signals 104A-C, such as the SIGINT signals used to produce the graphs in FIG. 5. As can be seen by comparing FIG. 8 to FIG. 6, by using more observables (e.g., SIGINT events) better separation between residual distributions can be achieved. A difference between FIGS. 6 and 8 is the number of observables used in calculating the residuals. Separation between the distributions in the bar graphs of FIG. 8 is generally greater than the separation between the distributions in the bar graphs of FIG. 6. This greater separation indicates that the number of errors in associating a tracklet with a set of SIGINT events can be reduced by increasing the number of observables. Thus, increasing the number of observables used to associate the tracklet with a set of SIGINT events can increase the accuracy and reduce the number of errors in associating SIGINT signals 104A-C with objects 102A-C or tracklets 106A-C.

For each graph in FIGS. 4-6 and 8 a thousand observable samples were generated and observables were corrupted by random error of controlled variance (low, medium, and high corresponding to the signal quality, the high variance was for low signal quality, the medium variance was for medium signal quality and the low variance was for high signal quality). The average of the residuals for each candidate track versus the correct track are presented in TABLE 1 of FIG. 4, TABLE 2 of FIG. 5, TABLE 3 of FIG. 6, and TABLE 4 of FIG. 8. The distribution of observed residuals for each track combination is presented so that the amount of overlap between distributions can be observed (in graphs "1-1"; "1-2"; "1-3"; "2-1"; "2-2"; "2-3"; "3-1"; "3-2"; and "3-3" of each of the FIGS. 4-6 and 8). For example, results for 1-1 can correspond to the observed residuals when track 1 is the correct track, and track 1 is selected. This can be non-zero due, at least in part, to the errors added to reflect a physical model inaccuracy. The physical model can be of a SIGINT signal 104A-C travel medium.

Figure 9:
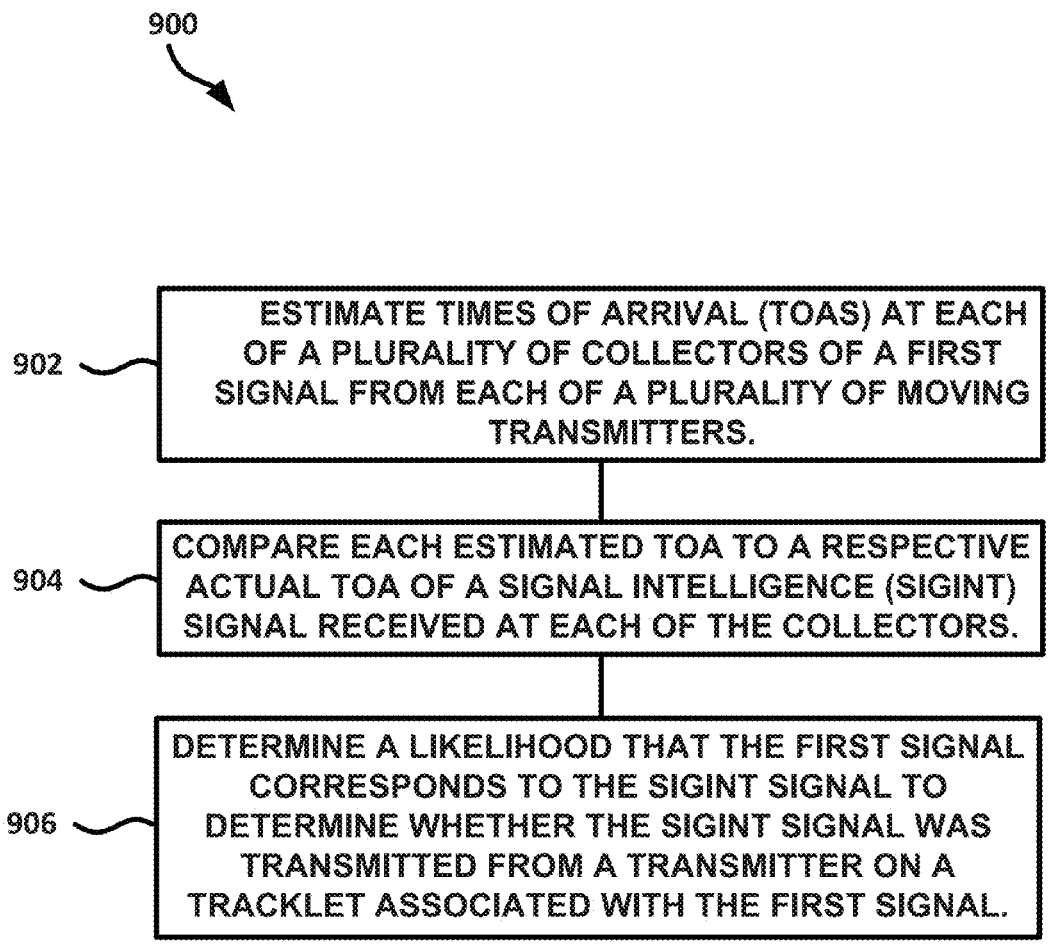
FIG. 9 shows an example of a technique for associating a SIGINT signal with a tracklet.

FIG. 9 shows an example of a technique 900 for associating a SIGINT signal 104A-C with an object 102A-C or tracklet 106A-C. At 902, ToAs at each of a plurality of collectors 108 of a first signal from each of a plurality of moving transmitters can be estimated. Each first signal can be transmitted from a transmitter on a tracklet 106A-C extracted from video data and received at the plurality of collectors 108. The location of each of the plurality of collectors 108 can be known, predetermined, or discernible. Estimating the ToAs at the plurality of collectors 108 can include (1) estimating a first time, the first time indicating how long it would take the first signal to travel from a point on the tracklet 106A-C to a collector 108, (2) determining a second time, the second time indicating the time at which the transmitter was at the point on the tracklet 106A-C; or (3) determining an estimated ToA at the collector 108 as a function of the first time and the second time.

At 904, each estimated ToA can be compared to a respective actual ToA of a SIGINT signal 104A-C received at each of the collectors 108. At 906, a likelihood that the first signal corresponds to the SIGINT signal 104A-C can be determined, such as to determine whether the SIGINT signal 104A-C was transmitted from a transmitter (e.g., emitter) on the corresponding tracklet 106A-C.

The technique 900 can include generating a bounding area. Tracklets 106A-C that eventually have related residual errors calculated can be within the bounding area, such as within a specified time window, such as to constrain the number of tracklets 106A-C to calculate residuals based on or constrain tracklets 106A-C to those within the bounding area. The bounding area can include a geographical region in which a SIGINT event is estimated to have originated from as a function of an estimated location or a corresponding covariance defining a confidence interval that the estimated location is the actual location the SIGINT event originated from. Each of the plurality of SIGINT events can include a SIGINT signal 104A-C and the actual ToA of the SIGINT signal. The tracklets 106A-C can be determined to each be active in the bounding area in a time window. The time window can be determined as a function of the actual ToAs of SIGINT signals 104A-C at the plurality of collectors 108.

The technique can include determining a plurality of residual errors, one residual error for each tracklet 106A-C of a plurality of tracklets per SIGINT event. Each residual error can represent a likelihood that a SIGINT event originated from a respective object 102A-C on the tracklet 106A-C. The residual error can be determined as a function of (1) an interpolated location of the transmitter at a specified time, (2) the actual ToAs at each collector 108 of the SIGINT event, and (3) the location of each collector 108. The interpolated location can be determined based on tracklet 106A-C data from full motion video.

The technique 900 can include determining the SIGINT signal 104A-C originated from an object 102A-C on the tracklet 106A-C that corresponds to a lowest residual error of the plurality of residual errors. The technique 900 can include determining if it is more likely that the SIGINT signal 104A-C originated from a moving transmitter or a stationary transmitter.

Techniques, apparatuses, or systems discussed in this disclosure can reduce the processing time of associating a SIGINT event or signal 104A-C with an object 102A-C as compared to a prior technique, apparatus, or system. The time between receipt of observables (e.g., SIGINT events or signals 104A-C) across multiple intelligence sources to the association of the observable with an object 102A-C can be reduced. Accelerating this process can expand the application space of the disclosure, possibly to the point where tracks or tracklets 106A-C or there associations with SIGINT signals 104A-C can be improved to near real-time associations.

The SIGINT association can iterate through trial locations on the ground (i.e. on the tracklet 106A-C) to reduce a residual error between expected Time of Arrival (ToA) at the collector 108, such as based on a physical model or an actual ToA at the collector 108. The tracklets 106A-C considered can be limited to a candidate or constrained tracklet 106A-C set within a bounding area, such as a bounding area determined based on an estimated location of where the relevant SIGINT signal 104A-C originated from or a covariance that defines a confidence level of the estimated location being the actual location of origin of the SIGINT signal 104A-C.

Consider a case where associated SIGINT observations (e.g., computed ToAs at collectors 108 or Time Differences of Arrival (TDoAs) of SIGINT signals 104A-C at collectors 108 determined to be from the same emitter) are the last arriving variables to a SIGINT association process. Given the collector 108 positions, such as collector 108 positions over time, and tracklet 106A-C information (e.g., data defining the tracklets 106A-C from video, such as full motion video), the processing time it takes from the arrival of the ToAs and the association of the SIGINT signals 104A-C to tracklets 106A-C can be reduced. This can be accomplished, such as by computing or transforming (e.g., pre-computing or pre-transforming) the track observation time from the video to a predicted observation time at the collectors 108. This computation can help simplify a later association of a process of associating the SIGINT signals 104A-C to the tracklets 106A-C. These transformed observations can be used to generate estimated residuals using the transformed or computed SIGINT signal 104A-C times at the collectors 108, allowing for residual optimization within a limited number of computations (from the arrival time of the associated SIGINT observations, such as the SIGINT ToAs). Residual reduction applied to the transformed or computed collector 108 times can be equivalent to, or as beneficial as, residual reduction or optimization as applied to locations on the tracklets 106A-C.

A physical model can be used to estimate ToAs at the collector 108. This can be followed by computations of residuals. In conventional geo-location, a gradient (i.e. a change in a residual based on a change in location on the ground) can be used to update to a new location of the object 102A-C or tracklet 106A-C. Instead of repeatedly estimating ToAs at the collector 108 based on a physical model, residuals can be computed at a new time offset at the collectors 108 after the ToAs at the collectors 108 are received. This may include interpolation between observations if the sampling resolution (e.g., of the video or the SIGINT reception at the collector 108) is inadequate.

A latency of associating a SIGINT signal 104A-C to an object 102A-C or tracklet 106A-C can be reduced by converting tracklet 106A-C observation times (e.g., the time the video data corresponding to the tracklet 106A-C was recorded) to an expected or estimated collector 108 observation time (e.g., the time the SIGINT signal 104A-C is received at the collector 108, such as prior to receiving the associated SIGINT observations.

For an individual SIGINT event, a collection of associated observed ToAs of the SIGINT signal 104A-C associated with the SIGINT event at the collector 108 can be generated, such as one for each collector. This can be represented as follows: $S_i = \{TOA_{i1}, TOA_{i2} \ldots TOA_{ij} \ldots TOA_{iN}\}$, where i is a SIGINT signal 104A-C index and j is a collector 108 index and there are N collectors 108.

For each candidate tracklet 106A-C, a set of locations over time can form the track, which can be represented as follows: $T_m = \{(X_{m1}, Y_{m1}, Z_{m1}, T_{m1}), \ldots, (X_{mKm}, Y_{mKm}, Z_{mKm}, T_{mKm})\}$ where m is a tracklet 106A-C index with $K_m$ observations with associated location $(X_m, Y_m, Z_m)$ at time $T_m$.

Given an ephemeris of the collectors 108, or an ability to interpolate ephemeris to a time, such as in a specified time window, the collector 108 locations at a specified time can be (estimated) as follows:
$C_n = \{X_n, Y_n, Z_n, T_n\}$ where n is a collector 108 index with collector 108 location $(X_n, Y_n, Z_n)$ at time $T_n$.

For any given location in space, and a specified transmission time, a physical model can help predict or estimate an expected ToA of the SIGINT signal 104A-C $S_i$ at each collector 108. The transmission times and locations of a transmitter that transmits the SIGINT signal can be unknown. A set of observed objects 102A-C, that can include a potential emitter, and their locations at a subset of times can be known. Transforming the tracklet 106A-C observations (e.g., location or time) to predicted collector 108 observations can be represented as follows:

$T_m \rightarrow \{T_{mn1}, \ldots, t_{mnKm}\}$ where m is the tracklet 106A-C index, n is the collector 108 index, and there are $K_m$ observations of the tracklet 106A-C m.

The tracklet 106A-C observation times and SIGINT signal 104A-C observation times may not match perfectly. In such cases, the tracklet 106A-C observations can be up-sampled, such as by assuming relatively consistent motion between tracklet 106A-C observations. Such up-sampling can help get a tracklet 106A-C observation closer in time than a non-up-sampled set of tracklet 106A-C data. Other methods of interpolation between tracklet 106A-C observations or SIGINT observations can be used to provide estimates closer in time than would otherwise be available, such as to provide an estimate adequately close in time.

The sum of the squared differences (i.e., the residual) between the physical model time and the actual observation times can provide an estimate of the likelihood of that tracklet 106A-C (e.g., location) being associated with the SIGINT event, such as relative to alternatives. Due to errors in the observations, perfect alignment of tracklet 106A-C times transformed to collector times with actual ToA observations at collectors 108 may not be attained.

Assume that for each SIGINT event K there are up to M SIGINT observations $\{S_{1K}, S_{2K}, \ldots, S_{MK}\}$, where M is the number of collectors 108 with observations for this SIGINT event. A tracklet 106A-C time offset ($\Delta$) can be determined, for each tracklet 106A-C i, that minimizes the sum of squared residuals as follows:

$$RES_{i,k} = \min_{\Delta}\left(\sum_{j=1}^{M} (TOA_{jk} - t_{ij\Delta})^2\right)$$

Summing these residuals across a plurality of SIGINT events associated with the same tracklet 106A-C or object 102A-C can provide an estimate of the "fit" of the tracklet 106A-C to the associated SIGINT events. A complication to this process can include tracklets 106A-C being variable in the duration of observations. To account for this, the sum-of-squared residuals can be scaled based on the number of observations. Only tracklets with durations that support an "adequate" number (e.g., threshold number, such as a predetermined number) of potential associated SIGINT events (e.g., N, where N can vary for each SIGINT event) can be considered as follows:

$$TOTAL_{RES_i} = \frac{\sum_k RES_{i,k}}{N}$$

Processing can be further accelerated by filtering out tracklets 106A-C that are likely not associated with a SIGINT event or SIGINT signal 104A-C. If the SIGINT event has a corresponding computed location estimate or ground time (e.g., estimated transmission time), $(S_{Xk}, S_{Yk}, S_{Tk})$, then tracklets 106A-C can be excluded by removing tracklets with a distance from the estimated observation location that is above a threshold. A derivation of a distance parameter to compare to the threshold can be as follows:

Assume a bivariate Gaussian distribution with parameters $(\mu_x, \mu_y, \sigma_x, \sigma_y, \rho)$ are derived from the threshold percentage (e.g., a percentage between 90 percent to 100 percent, such as 95 percent, or a lower percentage, such as 50 percent, 75 percent, 80 percent, or other percentage) confidence ellipse parameters (x, y, a, b, $\theta$):

$$\mu_x = x$$
$$\mu_y = y$$
$$\sigma_x = \sqrt{\left(\cos\theta\left(\frac{a}{2.4477}\right)\right)^2 + \left(\sin\theta\left(\frac{b}{2.4477}\right)\right)^2}$$
$$\sigma_y = \sqrt{\left(\sin\theta\left(\frac{a}{2.4477}\right)\right)^2 + \left(\cos\theta\left(\frac{b}{2.4477}\right)\right)^2}$$
$$\rho = \frac{\sin\theta\cos\theta\left(\left(\frac{b}{2.4477}\right)^2 - \left(\frac{a}{2.4477}\right)^2\right)}{\sigma_x\sigma_y}$$

A BiVariate Normal (BVN) score to compare to the threshold can be defined as:

$$BVN(i, j) = \frac{1}{2\pi\sigma_x\sigma_y\sqrt{1-\rho^2}}\exp\left[-\frac{z}{2(1-\rho^2)}\right]$$

where $$z = \frac{(X_i - \mu_x)^2}{\sigma_x^2} - \frac{2\rho(X_i - \mu_x)(Y_i - \mu_y)}{\sigma_x\sigma_y} + \frac{(Y_i - \mu_y)^2}{\sigma_y^2}.$$

The BVN score can be viewed as the probability that the tracklet 106A-C observation matches the SIGINT observation. BVN scores for multiple associated SIGINT events (e.g., SIGINT events known to originate from the same object 102A-C or transmitter) can be obtained by multiplying the individual scores. Low scoring tracklets 106A-C (e.g., tracklets 106A-C that have a BVN score lower than a predefined threshold) can be excluded from further processing. By adjusting the threshold higher more possible tracklets 106A-C can be removed from processing and processing time can be decreased. The threshold may not be set too high such that no tracklets 106A-C attain a score higher than the threshold. Alternatively, the threshold can be defined such that a score less than the threshold means that the tracklet 106A-C is sufficiently close to the location to be considered in a process of associating a SIGINT signal 104A-C with the tracklet 106A-C A previously described approach performed residual reduction on each SIGINT event in an associated set of SIGINT events to find a likely tracklet 106A-C to associate with each SIGINT event. The residual reduction for each SIGINT event can be done using a transformed time at the collector 108 and a linear search. Note that for unconstrained geolocation a linear time search may not be adequate as the search is across multiple dimensions (e.g., three if altitude is included). Because tracklets 106A-C can limit the search to one dimension at any instant in time (i.e., one track observation to the next track observation) then constrained search on the ground can be substantially equivalent to a linear search at the collectors 108 (e.g., in collector 108 time).

With pre-computed time observations at the collector, the process can function faster, such as with no additional information than was previously used.

In some examples, such as examples with high video frame rates associated with video data of the tracklets 106A-C, it can be assumed that the tracklet 106A-C observations are errorless. In these examples, spacings between tracklet 106A-C observations can be equally errorless.

In one or more examples, the tracklet 106A-C observations can be "slid" along with the SIGINT signal 104A-C observations. This process can be simplified by generating equally spaced tracklet 106A-C observations, such as can be similar to or present in full motion video. Sliding a time offset (e.g., by a sample or fraction of a sample) on the ground (e.g., on a tracklet 106A-C) can be equivalent to sliding time in the transformed (expected) collector 108 observation times. A constant time offset on the ground can mean a variable offset at the collectors 108. This variability can be accounted for in the transformation process, or interpolation between the transformed points.

Figure 10:
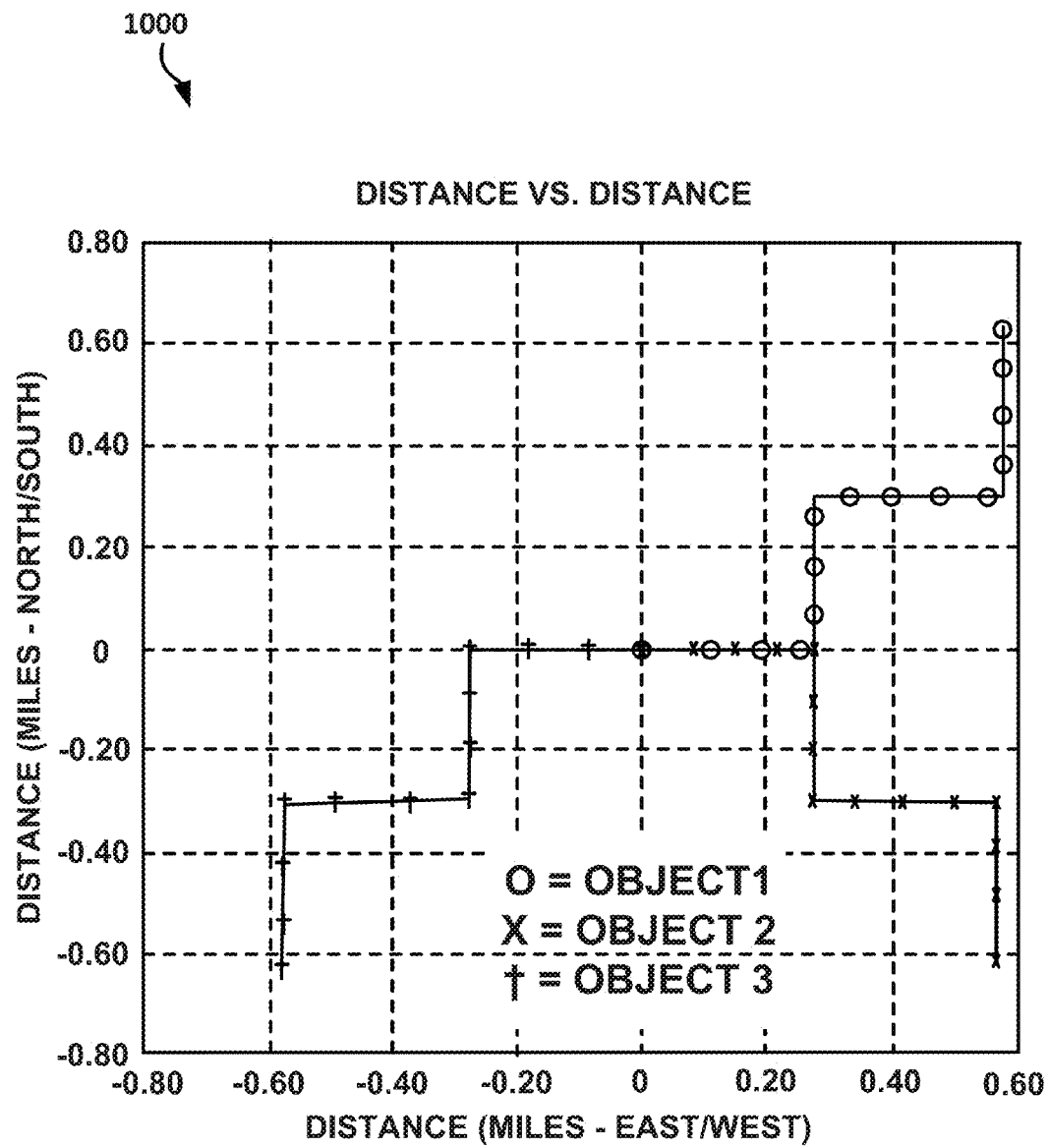
FIG. 10 shows an example of a graph of distance versus distance of three objects travelling at the same general speed.

FIG. 10 shows a line graph of distance versus distance that depicts motion of three objects (object 1, object 2, and object 3). Simulations were performed to demonstrate the benefit of using residuals to associate SIGINT to movers can be preserved when working with track times transformed to an expected arrival time at a collector 108 for each collector 108.

Figure 11:
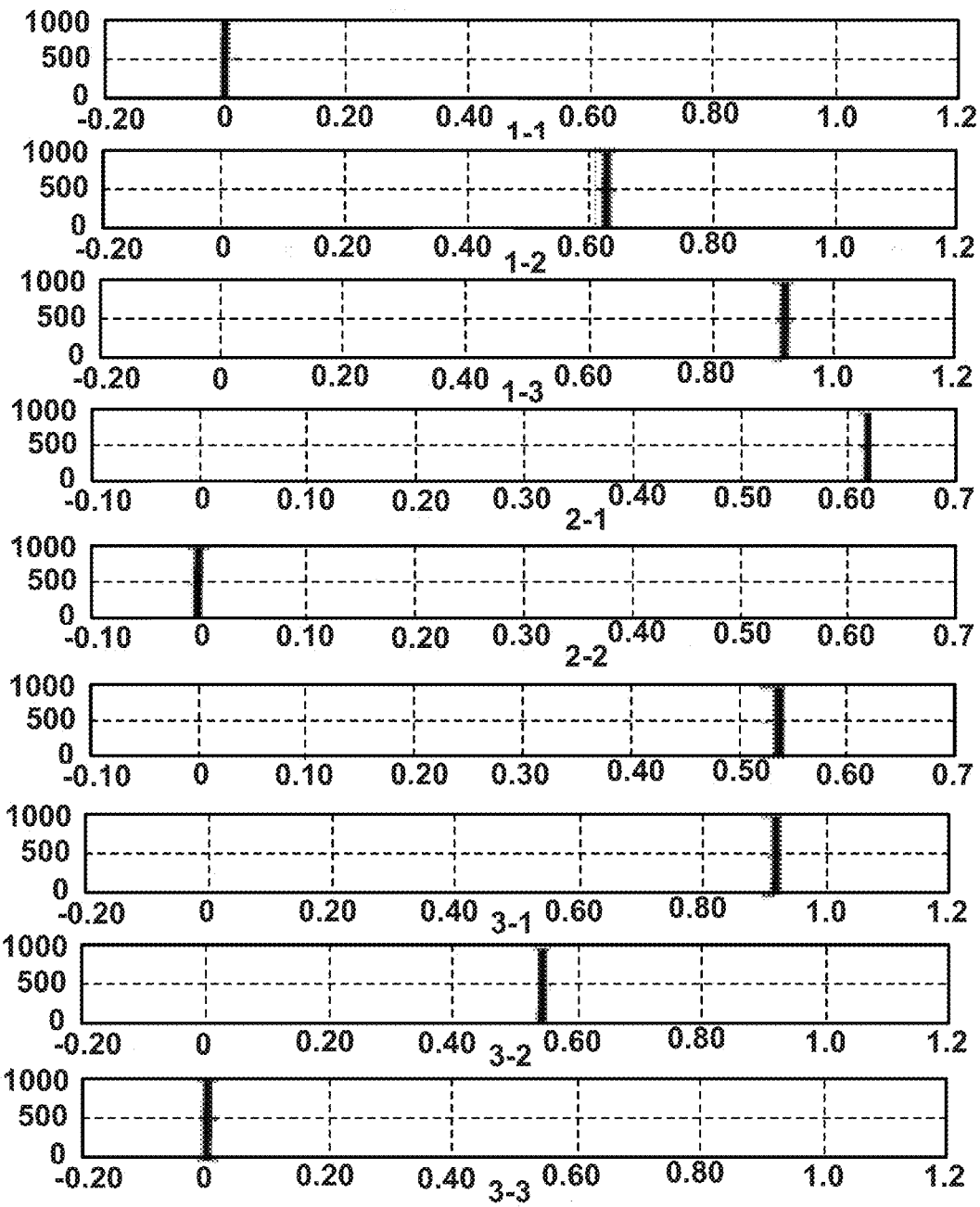
FIG. 11 shows an example of a table that summarizes averages of residual errors determined using ten observations of perfect quality (i.e. no variance due to signal error) SIGINT signals sent from the objects shown in FIG. 10 and also shows nine bar graphs, each depicting a distribution of calculated residual errors so as to help visualize how much overlap or separation occurs between the example residual error calculations for the objects.
Figure 12:
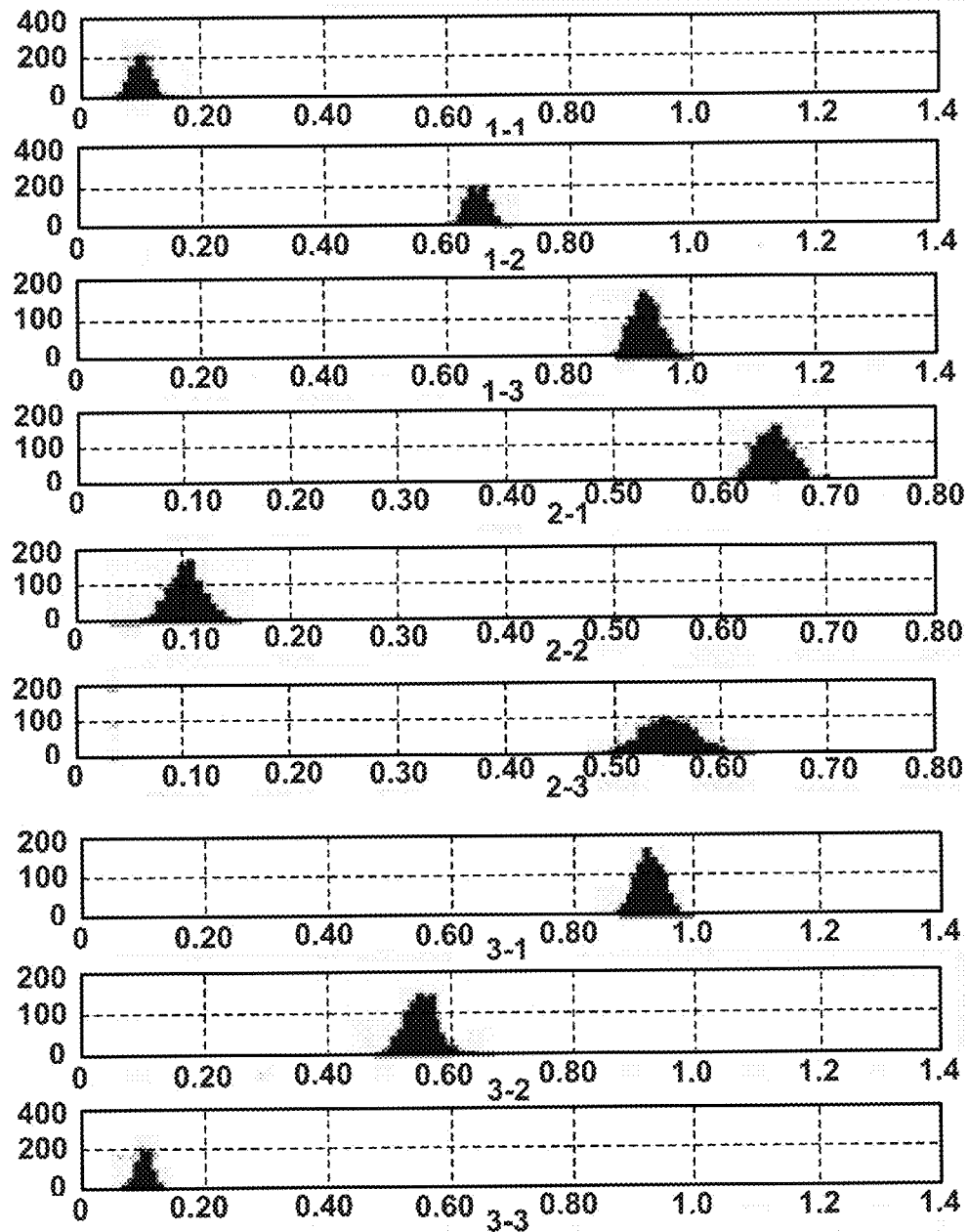
FIG. 12 shows an example of a table that summarizes averages of residual errors determined using ten observations of medium quality SIGINT signals sent from the objects shown in FIG. 10 and also shows nine bar graphs, each depicting a distribution of calculated residual errors so as to help visualize how much overlap or separation occurs between the example residual error calculations for the objects.
Figure 13:
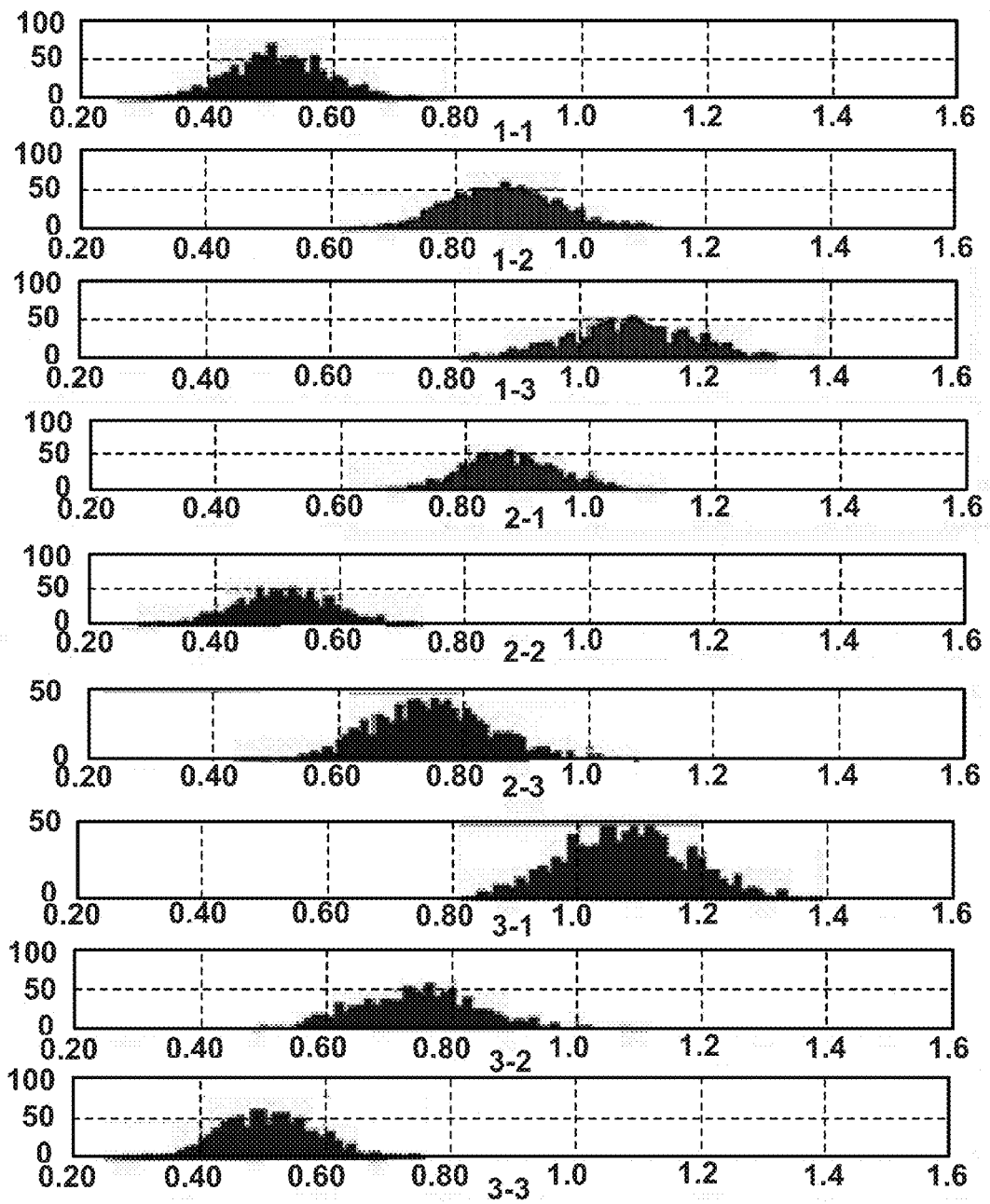
FIG. 13 shows an example of a table that summarizes averages of residual errors determined using ten observations of low quality SIGINT signals sent from the objects shown in FIG. 10 and also shows nine bar graphs, each depicting a distribution of calculated residual errors so as to help visualize how much overlap or separation occurs between the example residual error calculations for the objects.

FIGS. 11, 12, and 13 show nine bar graphs (nine bar graphs ("1-1"; "1-2"; "1-3"; "2-1"; "2-2"; "2-3"; "3-1"; "3-2"; and "3-3"), where each graph is labeled using the same convention as discussed with regard to FIGS. 4, 5, and 6.

FIG. 11 shows residuals calculated using the objects as depicted in FIG. 10 using high quality SIGINT signals (e.g., SIGINT signals 104A-C that have relatively high Signal to Noise Ratio (SNR), no noise, or high magnitude at the collector 108); FIG. 12 shows residuals calculated using the objects as depicted in FIG. 10 using medium quality SIGINT signals 104A-C that have a lower SNR or lower magnitude than the high quality SIGINT signals 104A-C of FIG. 11; and FIG. 13 shows residuals calculated using the objects as depicted in FIG. 10 using low quality SIGINT signals 104A-C that have a lower SNR or lower magnitude than the medium quality SIGINT signals 104A-C of FIG. 12. This series of FIGS. 11, 12, and 13 shows that the processes discussed herein can associate SIGINT events or signals 104A-C with objects 102A-C or tracklets 106A-C, such as objects that are relatively close together (e.g., within less than about five hundred feet of each other), accurately. These FIGS. 11, 12, and 13 also demonstrate that as the SIGINT signal 104A-C quality is reduced, the accuracy of the process is also reduced. This is due, at least in part, to the confidence interval of an object 102A-C location being reduced (and the resulting residual ellipse getting bigger) as the quality of the SIGINT signal 104A-C received is reduced. The bar graphs show the distribution over one thousand trials. Overlaps between bar graphs labeled with the same beginning number (e.g., "1-1", "1-2", and "1-2") indicate regions where possible errors in associating a SIGINT event with a tracklet 106A-C or object 102A-C can occur. The residuals in the bar graphs of FIGS. 11, 12, and 13 were computed by converting tracklet 106A-C times or locations to collector 108 times or distances from the tracklet 106A-C observations to the collector 108, then performing residual reduction by effectively sliding (i.e. evaluating the effect of varying ground time offsets on residuals) against the transformed observations in time. A brief description of sliding against transformed observation in time is presented. In summary, a computation of a residual is performed by summing a squared difference between collector 108 observation times and a predicted arrival time (at each collector) based on a location on the tracklet 106A-C n the ground. The arrival times (ToAs) of the SIGINT signals 104A-C can be predicted in advance. If a video image time on the ground matches the predicted time of arrival is easily estimated. If the time on the ground is between predicted observations then an interpolation may be done. If a linear interpolation at the collectors is assumed to be adequate, such as can be based on the frequency of video samples, then interpolating a time offset of a certain percentage on the ground can result in nearly the same percentage of time offset can be observed at the collectors 108. A sliding scale simply moves the collector time in this linear (and sometimes in non-linear) fashion based on the time offset on the ground. Sliding refers to applying this "variable ruler" at the collectors to achieve the same effect as evaluating the change in location on the ground (for each SIGINT event separately).

Figure 14:
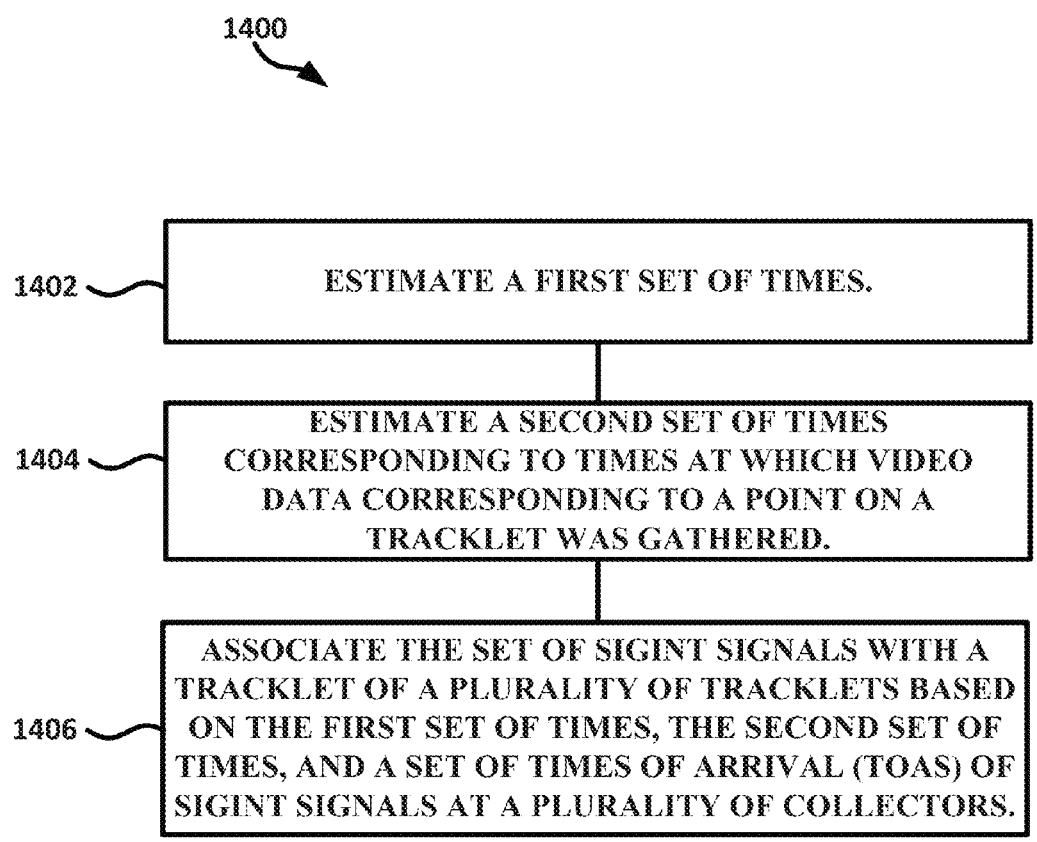
FIG. 14 shows an example of a technique for associating a SIGINT signal with an object or a tracklet.

FIG. 14 shows a technique 1400 for associating a SIGINT signal 104A-C with an object 102A-C or tracklet 106A-C. At 1402, a first set of times can be estimated. Each time of the first set of times can indicate how much time it would take for a respective SIGINT signal 104A-C of a set of a plurality of SIGINT signals to travel from a point on a tracklet 106A-C of a plurality of tracklets extracted from video data to a respective collector 108 of a plurality of collectors at determinable locations, such as within a known or calculable accuracy. At 1404, a second set of times corresponding to times at which the video data corresponding to the point on the tracklet 106A-C was gathered can be estimated. At 1406, the set of SIGINT signals can be associated with a tracklet 106A-C of the plurality of tracklets based on the first set of times, the second set of times, and a set of Times of Arrival (ToAs) of SIGINT signals at the plurality of collectors. Estimating the first set of times can occur before the ToAs of the SIGINT signals at the plurality of collectors are received The technique 1400 can include removing a tracklet 106A-C of the plurality of tracklets so as to not estimate the first set of times based on the removed tracklet 106A-C if the tracklet 106A-C is not within an expected range of locations. The technique 1400 can include determining a plurality of residual errors, one residual error for each tracklet 106A-C of the plurality of tracklets per set of SIGINT signals. Each residual error can represent a likelihood that the set of SIGINT signals originated from a respective object 102A-C on the tracklet 106A-C. The residual error can be determined based on (1) the first set of times, (2) the second set of times, or (3) the ToAs of the SIGINT signals of the set of SIGINT signals at the plurality of collectors.

The technique 1400 can include determining the set of SIGINT signals originated from the tracklet 106A-C that corresponds to a lowest residual error of the plurality of residual errors. The technique 1400 can include interpolating where an emitter would have been on a tracklet of the plurality of tracklets if a time resolution of the video data is less than a time resolution of SIGINT observations at a collector 108 of the plurality of collectors or interpolating a ToA of a signal at the collector 108 of the plurality collectors if a time resolution of the video data is greater than a time resolution of SIGINT signal observations at the collector 108.

The technique 1400 can include calculating an expected delay based on two times of the first set of times, wherein the expected delay indicates how much time is expected to pass between the SIGINT signal being received at a first collector 108 of the plurality of collectors and a second collector 108 of the plurality of collectors, wherein the first and second collectors are different collectors. The residual error can be determined based on the expected delay and an actual observed delay determined based on actual ToAs of the SIGINT signal at the first and second collectors.

The presented techniques, apparatuses, or systems for associating SIGINT signals 104A-C to tracklets 106A-C of moving emitters can exploit readily available SIGINT observable data and tracklet 106A-C data. The SIGINT observable data can originate from various collectors 108.

Simulation results indicate the benefit of transforming tracklet 106A-C to an arrival time at a collector 108 for a case of simple relative motion between a set of moving objects 102A-C, multiple collectors 108, and sets of associated SIGINT events. More complex motion, such as starting and stopping and variation in speed, can be beneficial to the process if it results in diversity between the prospective movers (e.g., moving objects 102A-C).

An association of SIGINT signals 104A-C to tracklet 106A-C or object 102A-C can be used in a variety of applications. The residuals generated for association hypotheses can be used to support defragmentation of tracks in a multi hypothesis tracker. The association process by itself can determine which object 102A-C is most likely associated with a specific collection of associated SIGINT events, such as to help support future detection of a specific object 102A-C. These approaches can provide a mechanism to determine if the collection of SIGINT events originated from a stationary emitter (e.g., a stationary object 102A-C) and can provide a measure of confidence for the stationary assumption.

The benefits of one or more techniques discussed herein can be limited by the delay of receiving the SIGINT events (e.g., ToAs at the collectors 108). This can be due to a timeliness requirement for the SIGINT system, communication limitations between systems or items of the system, long integration times, or due to a complex SIGINT association process. One or more presented techniques can limit the impact of SIGINT signal 104A-C observation delays by reducing the computations that occur after the arrival of this data.

One or more techniques discussed herein can provide a more timely approach to exploiting SIGINT, such as in high density urban areas, such as for the purpose of improving the location associated with SIGINT events, or such as to improve a tracking process.

Figure 15:
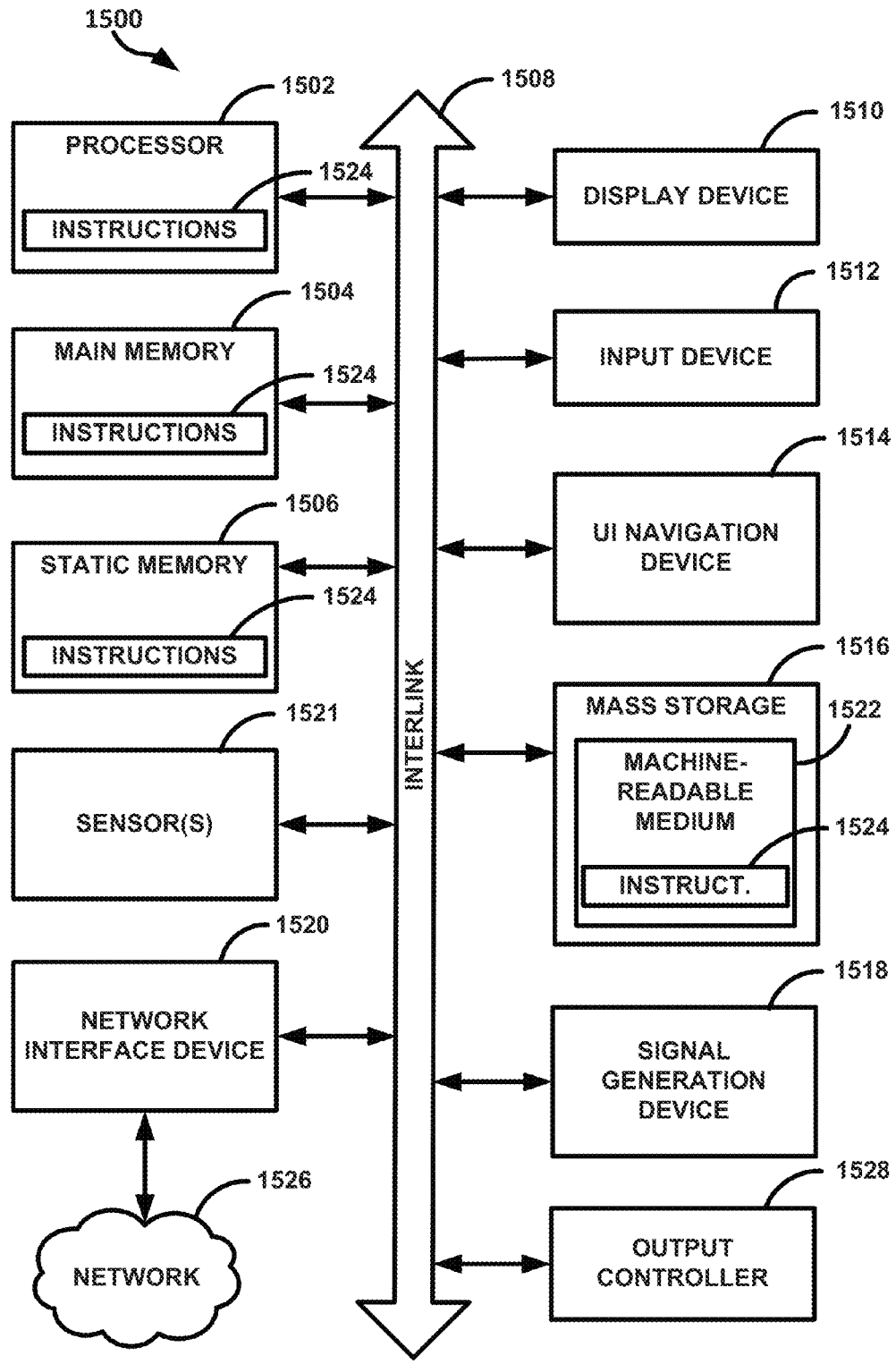
FIG. 15 shows a block diagram of an example of a machine upon which any of one or more techniques (e.g., methods) or processes discussed herein may be performed.

FIG. 15 illustrates a block diagram of an example machine 1500 upon which any one or more of the techniques (e.g., methodologies) discussed herein may perform. In alternative embodiments, the machine 1500 may operate as a standalone device or may be connected (e.g., networked) to other machines. In a networked deployment, the machine 1500 may operate in the capacity of a server machine, a client machine, or both in server-client network environments. In an example, the machine 1500 may act as a peer machine in peer-to-peer (P2P) (or other distributed) network environment. The machine 1500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 1500 may include a hardware processor 1502 (e.g., a central processing unit (CPU), a graphics processing unit (GPU), a hardware processor core, or any combination thereof), a main memory 1504 and a static memory 1506, some or all of which may communicate with each other via an interlink (e.g., bus) 1508. The machine 1500 may further include a display unit 1510, an alphanumeric input device 1512 (e.g., a keyboard), and a user interface (UI) navigation device 1514 (e.g., a mouse). In an example, the display unit 1510, input device 1512 and UI navigation device 1514 may be a touch screen display. The machine 1500 may additionally include a storage device (e.g., drive unit) 1516, a signal generation device 1518 (e.g., a speaker), a network interface device 1520, and one or more sensors 1521, such as a global positioning system (GPS) sensor, compass, accelerometer, or other sensor. The machine 1500 may include an output controller 1528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1516 may include a machine readable medium 1522 on which is stored one or more sets of data structures or instructions 1524 (e.g., software) embodying or utilized by any one or more of the techniques or functions described herein. The instructions 1524 may also reside, completely or at least partially, within the main memory 1504, within static memory 1506, or within the hardware processor 1502 during execution thereof by the machine 1500. In an example, one or any combination of the hardware processor 1502, the main memory 1504, the static memory 1506, or the storage device 1516 may constitute machine readable media.

While the machine readable medium 1522 is illustrated as a single medium, the term "machine readable medium" may include a single medium or multiple media (e.g., a centralized or distributed database, and/or associated caches and servers) configured to store the one or more instructions 1524.

The term "machine readable medium" may include any medium that is capable of storing, encoding, or carrying instructions for execution by the machine 1500 and that cause the machine 1500 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1524 may further be transmitted or received over a communications network 1526 using a transmission medium via the network interface device 1520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1520 may include one or more physical jacks (e.g., Ethernet, coaxial, or phone jacks) or one or more antennas to connect to the communications network 1526. In an example, the network interface device 1520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1500, and includes digital or analog communications signals or other intangible medium to facilitate communication of such software.

EXAMPLES AND NOTES

The present subject matter may be described by way of several examples.

Example 1 can include or use subject matter (such as an apparatus, a method, a means for performing acts, or a device readable memory including instructions that, when performed by the device, can cause the device to perform acts), such as can include or use estimating Times of Arrival (ToAs) at each of a plurality of collectors of a first signal from each of a plurality of moving transmitters, each first signal transmitted from a transmitter on a tracklet extracted from video data and received at the plurality of collectors, wherein a location of each of the plurality of collectors is known, comparing each estimated ToA to a respective actual ToA of a SIGnal INTelligence (SIGINT) signal received at each of the collectors, or determining a likelihood that the signal corresponds to the SIGINT signal to determine whether the SIGINT signal was transmitted from a transmitter on the corresponding tracklet.

Example 2 can include or use, or can optionally be combined with the subject matter of Example 1, to include or use generating a bounding area so as to constrain tracklets to tracklets within the bounding area, wherein the bounding area includes a geographical region in which a SIGINT event is estimated to have originated from as a function of an estimated location and corresponding covariance defining a confidence that the estimated location is the actual location the SIGINT event originated from, wherein each of the plurality of SIGINT events includes a SIGINT signal and the actual ToA of the SIGINT signal.

Example 3 can include or use, or can optionally be combined with the subject matter of Example 2, to include or use determining a plurality of residual errors, one residual error for each tracklet in a plurality of tracklets per SIGINT event, wherein each residual error represents a likelihood that a SIGINT event originated from a respective object on the tracklet, wherein the residual error is determined as a function of (1) an interpolated location of the transmitter at a specific time, the interpolated location determined based on the tracklet data, (2) the actual ToAs at each collector of the SIGINT event, and (3) the location of each collector.

Example 4 can include or use, or can optionally be combined with the subject matter of Example 3, to include or use determining the SIGINT signal originated from an object on the tracklet that corresponds to a lowest residual error of the plurality of residual errors.

Example 5 can include or use, or can optionally be combined with the subject matter of at least one of Examples 1-4, to include or use determining if it is more likely that the SIGINT signal originated from a moving transmitter or a stationary transmitter.

Example 6 can include or use, or can optionally be combined with the subject matter of at least one of Examples 1-5, to include or use wherein estimating the ToA at the plurality of collectors includes (1) estimating a first time, the first time indicating how long it would take the signal to travel from a point on the tracklet to a collector of the plurality of collectors, (2) determining a second time, the second time indicating the time at which the transmitter was at the point on the tracklet, or (3) determining an estimated ToA at a collector of the plurality of collectors as a function of the first time and the second time.

Example 7 can include or use, or can optionally be combined with the subject matter of at least one of Examples 2-6, to include or use wherein the plurality of tracklets were each active in the bounding area in a time window, the time window determined as a function of the actual ToAs of SIGINT signals at the plurality of collectors.

Example 8 can include or use subject matter (such as an apparatus, a method, a means for performing acts, or a device readable memory including instructions that, when performed by the device, can cause the device to perform acts), such as can include or use (1) estimating a first set of times, each time of the first set of times indicating how much time it would take for a respective SIGnal INTelligence (SIGINT) signal of a set of a plurality of SIGINT signals to travel from a point on a tracklet of a plurality of tracklets extracted from video data to a respective collector of a plurality of collectors at determinable locations, (2) estimating a second set of times corresponding to times at which the video data corresponding to the point on the tracklet was gathered, or (3) associating the set of SIGINT signals with a tracklet of the plurality of tracklets based on the first set of times, the second set of times, and a set of Times of Arrival (ToAs) of SIGINT signals at the plurality of collectors.

Example 9 can include or use or can optionally be combined with the subject matter of at least one of Examples 1-8 to include or use removing a tracklet of the plurality of tracklets so as to not estimate the first set of times based on the removed tracklet if the tracklet is not within an expected range of locations.

Example 10 can include or use or can optionally be combined with the subject matter of Examples 8-9 to include or use determining a plurality of residual errors, one residual error for each tracklet of the plurality of tracklets per set of SIGINT signals, wherein each residual error represents a likelihood that the set of SIGINT signals originated from a respective object on the tracklet, wherein the residual error is determined based on (1) the first set of times, (2) the second set of times, or (2) the ToAs of the SIGINT signals of the set of SIGINT signals at the plurality of collectors.

Example 11 can include or use or can optionally be combined with the subject matter of Example 10 to include or use determining the set of SIGINT signals originated from the tracklet that corresponds to a lowest residual error of the plurality of residual errors.

Example 12 can include or use or can optionally be combined with the subject matter of Examples 8-11 to include or use interpolating where an emitter would have been on a tracklet of the plurality of tracklets if a time resolution of the video data is less than a time resolution of SIGINT observations or interpolating a ToA of a signal at a collector of the plurality collectors if a time resolution of the video data is greater than a time resolution of SIGINT signal observations at the collector.

Example 13 can include or use or can optionally be combined with the subject matter of Examples 8-12 to include or use calculating an expected delay based on two times of the first set of times, wherein the expected delay indicates how much time is expected to pass between the SIGINT signal being received at a first collector of the plurality of collectors and a second collector of the plurality of collectors, wherein the first and second collectors are different collectors, and wherein the residual error is determined based on the expected delay and an actual observed delay determined based on actual ToAs of the SIGINT signal at the first and second collectors.

Example 14 can include or use or can optionally be combined with the subject matter of Examples 8-13 to include or use wherein estimating the first set of times occurs before the ToAs of the SIGINT signal at the plurality of collectors are received.

Example 15 can include or use, or can be optionally combined with the subject matter of at least one of Examples 9 or 11-14, to include subject matter (such as an apparatus, a method, a means for performing acts, or a device readable memory including instructions that, when performed by the device, can cause the device to perform acts), such as can include or use (1) estimating a first set of times, each time of the first set of times indicating how much time it would take for a respective SIGnal INTelligence (SIGINT) signal of a set of a plurality of SIGINT signals to travel from a tracklet of a plurality of tracklets extracted from video data to a respective collector of a plurality of collectors at determinable locations, (2) adding each time of the first set of times to a respective second time to create a set of third times, wherein the respective second time is a time at which the video data corresponding to the different point on the tracklet was gathered, or (3) associating the set of SIGINT signals with a tracklet of the plurality of tracklets based on the set of third times and a set of Times of Arrival (ToAs) of SIGINT signals at the plurality of collectors.

Example 16 can include or use or can optionally be combined with the subject matter of Example 15 to include or use determining a plurality of residual errors, a residual error for each tracklet of the plurality of tracklets per set of SIGINT signals, wherein each residual error represents a likelihood that the set of SIGINT signals originated from a respective object on the tracklet, wherein the residual error is determined based on (1) the set of third times, or (2) the ToAs of the SIGINT signals of the set of SIGINT signals at the plurality of collectors.

Example 17 can include or use, or can be optionally combined with the subject matter of at least one of Examples 9 or 11-14, to include subject matter (such as an apparatus, a method, a means for performing acts, or a device readable memory including instructions that, when performed by the device, can cause the device to perform acts), such as can include or use (1) estimate a first set of times, each time of the first set of times indicating how much time it would take for a respective SIGnal INTelligence (SIGINT) signal of a set of a plurality of SIGINT signals to travel from a respective different point on a tracklet of a plurality of tracklets extracted from video data to a collector of a plurality of collectors at determinable locations, or (2) associate the set of SIGINT signals with a tracklet of the plurality of tracklets based on the first set of times and a set of Times of Arrival (ToAs) of SIGINT signals at the plurality of collectors.

Example 18 can include or use or can optionally be combined with the subject matter of Example 17 to include or use determining a plurality of residual errors, one residual error for each tracklet of the plurality of tracklets per set of SIGINT signals, wherein each residual error represents a likelihood that the set of SIGINT signals originated from a respective object on the tracklet, wherein the residual error is determined based on (1) the first set of times and (2) the ToAs of the SIGINT signals of the set of SIGINT signals at the plurality of collectors.

Example 19 can include or use or can optionally be combined with the subject matter of at least one of Examples 1-18 to include or use a processor configured to perform any one or more of the operation(s) of any one of Examples 1-18.

The above Description of Embodiments includes references to the accompanying drawings, which form a part of the detailed description. The drawings show, by way of illustration, specific embodiments in which methods, apparatuses, and systems discussed herein may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

The flowchart and block diagrams in the FIGS. illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The functions or techniques described herein may be implemented in software or a combination of software and human implemented procedures. The software may consist of computer executable instructions stored on computer readable media such as memory or other type of storage devices. The term "computer readable media" is also used to represent any means by which the computer readable instructions may be received by the computer, such as by different forms of wired or wireless transmissions. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

As used herein, a "-" (dash) used when referring to a reference number means "or", in the non-exclusive sense discussed in the previous paragraph, of all elements within the range indicated by the dash. For example, 103A-B means a nonexclusive "or" of the elements in the range {103A, 103B}, such that 103A-103B includes "103A but not 103B", "103B but not 103A", and "103A and 103B".

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Description of Embodiments, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Description of Embodiments as examples or embodiments, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

What is claimed is:

1. A method for associating tracklets with SIGnal INTelligence (SIGINT) signals, the method comprising:
   receiving, at a processing unit, the SIGINT signals and tracklets extracted from video data, the SIGINT signals including a respective actual Time of Arrival (ToA) indicating a time at which the SIGINT signal arrived at a collector of a plurality of collectors at known locations, the tracklets associated with respective objects in the video data, each tracklet identifying geolocations of a moving object of the respective objects;
   estimating, using the processing unit, an amount of time it takes for a first signal to travel from a geolocation of a tracklet of the tracklets to travel to each collector of the plurality of collectors and adding the estimated time to a video capture time corresponding to a time at which the object was at the geolocation of the tracklet to create estimated ToAs;
   comparing each estimated ToA of the estimated ToAs to the respective actual ToA of a SIGINT signal of the SIGINT signals received at each of the collectors;
   determining, based on the comparison, a likelihood that the first signal corresponds to the SIGINT signal to determine whether the SIGINT signal was transmitted from a transmitter on the corresponding tracklet; and
   associating the SIGINT signal to a tracklet of the tracklets corresponding to the greatest determined likelihood.

2. The method of claim 1, further comprising:
   generating a bounding area so as to constrain tracklets to tracklets within the bounding area, wherein the bounding area includes a geographical region in which a SIGINT event is estimated to have originated from as a function of an estimated location and corresponding covariance defining a confidence that the estimated location is the actual location the SIGINT event originated from, wherein each of the plurality of SIGINT events includes a SIGINT signal and the actual ToA of the SIGINT signal.

3. The method of claim 2, further comprising:
   determining a plurality of residual errors, one residual error for each tracklet in a plurality of tracklets per SIGINT event, wherein each residual error represents a likelihood that a SIGINT event originated from a respective object on the tracklet, wherein the residual error is determined as a function of (1) an interpolated location of the transmitter at a specific time, the interpolated location determined based on tracklet data from full motion video, (2) the actual ToAs at each collector of the SIGINT event, and (3) the location of each collector.

4. The method of claim 3, further comprising:
   determining the SIGINT signal originated from an object on the tracklet that corresponds to a lowest residual error of the plurality of residual errors.

5. The method of claim 4, further comprising:
   determining if it is more likely that the SIGINT signal originated from a moving transmitter or a stationary transmitter.

6. The method of claim 5, wherein estimating the ToA at the plurality of collectors includes:
   estimating a first time, the first time indicating how long it would take the first signal to travel from a point on the tracklet to a collector of the plurality of collectors;
   determining a second time, the second time indicating the time at which the transmitter was at the point on the tracklet; and
   determining an estimated ToA at the collector as a function of the first time and the second time.

7. The method of claim 6, wherein the plurality of tracklets were each active in the bounding area in a time window, the time window determined as a function of the actual ToAs of SIGINT signals at the plurality of collectors.

8. A non-transitory computer readable storage device including instructions stored thereon, the instructions, which when executed by a machine, cause the machine to perform operations for associating tracklets with SIGnal INTelligence (SIGINT) signals, the operations comprising:

receiving the SIGINT signals and tracklets extracted from video data, the SIGINT signals including a respective actual Time of Arrival (ToA) indicating a time at which the SIGINT signal arrived at a collector of a plurality of collectors at known locations, the tracklets associated with respective objects in the video data, each tracklet identifying geolocations of a moving object of the respective objects;

estimating an amount of time it takes for a first signal to travel from a geolocation of a tracklet of the tracklets to travel to each collector of the plurality of collectors and adding the estimated time to a video capture time corresponding to a time at which the object was at the geolocation of the tracklet to create estimated ToAs;

comparing each estimated ToA of the estimated ToAs to the respective actual ToA of a SIGINT signal of the SIGINT signals received at each of the collectors;

determining, based on the comparison, a likelihood that the first signal corresponds to the SIGINT signal to determine whether the SIGINT signal was transmitted from a transmitter on the corresponding tracklet; and associating the SIGINT signal to a tracklet of the tracklets corresponding to the greatest determined likelihood.

9. The storage device of claim 8, further comprising instructions, which when executed by the machine, cause the machine to perform operations comprising:

generating a bounding area so as to constrain tracklets to tracklets within the bounding area, wherein the bounding area includes a geographical region in which a SIGINT event is estimated to have originated from as a function of an estimated location and corresponding covariance defining a confidence that the estimated location is the actual location the SIGINT event originated from, wherein each of the plurality of SIGINT events includes a SIGINT signal and the actual ToA of the SIGINT signal.

10. The storage device of claim 9, further comprising instructions, which when executed by the machine, cause the machine to perform operations comprising:

determining a plurality of residual errors, one residual error for each tracklet in a plurality of tracklets per SIGINT event, wherein each residual error represents a likelihood that a respective SIGINT event originated from an object on a respective tracklet, wherein the residual error is determined as a function of (1) an interpolated location of the transmitter at a specific time, the interpolated location determined based on tracklet data from full motion video, (2) the actual TOA at each collector, and (3) the location of each collector.

11. The storage device of claim 10, further comprising instructions, which when executed by the machine, cause the machine to perform operations comprising:

determining the SIGINT signal originated from the tracklet that corresponds to the lowest residual error of the plurality of residual errors.

12. The storage device of claim 11, further comprising:

determining if it is more likely that the SIGINT signal originated from a moving transmitter or a stationary transmitter.

13. The storage device of claim 12, wherein the instructions for estimating the ToA at the plurality of collectors include instructions, which when executed by the machine, cause the machine to perform operations comprising:

estimating a first time, the first time indicating how long it would take the first signal to travel from a point on the tracklet to a collector of the plurality of collectors;

determining a second time, the second time indicating the time at which the transmitter was at the point on the tracklet; and determining an estimated ToA at the collector as a function of the first time and the second time.

14. The storage device of claim 13, wherein the plurality of tracklets were each active in the bounding area in a time window, the time window determined as a function of the actual ToAs of SIGINT events at the plurality of collectors.

15. A device configured to associate tracklets with SIGnal INTelligence (SIGINT) signals, the device comprising:

a processor configured to:

receive the SIGINT signals and tracklets extracted from video data, the SIGINT signals including a respective actual Time of Arrival (ToA) indicating a time at which the SIGINT signal arrived at a collector of a plurality of collectors at known locations, the tracklets associated with respective objects in the video data, each tracklet identifying geolocations of a moving object of the respective objects;

estimate an amount of time it takes for a first signal to travel from a geolocation of a tracklet of the tracklets to travel to each collector of the plurality of collectors and adding the estimated time to a video capture time corresponding to a time at which the object was at the geolocation of the tracklet to create estimated ToAs;

compare each estimated ToA of the estimated ToAs to the respective actual ToA of a SIGINT signal of the SIGINT signals received at each of the collectors;

determine, based on the comparison, a likelihood that the first signal corresponds to the SIGINT signal to determine whether the SIGINT signal was transmitted from a transmitter on the corresponding tracklet; and associate the SIGINT signal to a tracklet of the tracklets corresponding to the greatest determined likelihood.

16. The device of claim 15, wherein the processor is further configured to:

determine a plurality of residual errors, one residual error for each tracklet in a plurality of tracklets per SIGINT signal, wherein each residual error represents a likelihood that a SIGINT signal originated on a respective tracklet, wherein the residual error is determined as a function of (1) an interpolated location of the transmitter at a specific time, the interpolated location determined based on tracklet data from full motion video, (2) the actual TOA at each collector, and (3) the location of each collector.

17. The device of claim 16, wherein the processor is further configured to:

determine the SIGINT signal originated from the tracklet that corresponds to the lowest residual error of the plurality of residual errors.

18. The device of claim 17, wherein the processor is further configured to:

determine if it is more likely that the SIGINT signal originated from a moving transmitter or a stationary transmitter.

19. The device of claim 18, wherein the processor is further configured to:

generate a bounding area so as to constrain tracklets to tracklets within the bounding area, wherein the bounding area includes a geographical region in which a SIGINT event is estimated to have originated from as a function of an estimated location and corresponding covariance defining a confidence that the estimated location is the actual location the SIGINT event originated from, wherein each of the plurality of SIGINT events includes a SIGINT signal and the actual ToA of the SIGINT signal.

20. The device of claim 19, wherein the processor configured to estimate the ToA at the plurality of collectors includes the processor further configured to:
  estimate a first time, the first time indicating how long it would take the first signal to travel from a point on the tracklet to a collector of the plurality of collectors;
  determine a second time, the second time indicating the time at which the transmitter was at the point on the tracklet; and
  determine an estimated ToA at the collector as a function of the first time and the second time.

* * * * *